(12) United States Patent
Iwase

(10) Patent No.: US 11,494,089 B2
(45) Date of Patent: Nov. 8, 2022

(54) DISTRIBUTED STORAGE SYSTEM, DATA CONTROL METHOD AND STORAGE MEDIUM

(71) Applicant: Hitachi, Ltd., Tokyo (JP)

(72) Inventor: Hiromichi Iwase, Tokyo (JP)

(73) Assignee: HITACHI, LTD., Tokyo (JP)

( * ) Notice: Subject to any disclaimer, the term of this patent is extended or adjusted under 35 U.S.C. 154(b) by 25 days.

(21) Appl. No.: 17/005,936

(22) Filed: Aug. 28, 2020

(65) Prior Publication Data

US 2021/0191628 A1 Jun. 24, 2021

(30) Foreign Application Priority Data

Dec. 23, 2019 (JP) .............................. JP2019-231848

(51) Int. Cl.
*G06F 12/00* (2006.01)
*G06F 3/06* (2006.01)
*G06F 9/54* (2006.01)

(52) U.S. Cl.
CPC ............ *G06F 3/0619* (2013.01); *G06F 3/067* (2013.01); *G06F 3/0652* (2013.01); *G06F 3/0653* (2013.01); *G06F 3/0659* (2013.01); *G06F 3/0683* (2013.01); *G06F 9/542* (2013.01)

(58) Field of Classification Search
CPC ....... G06F 3/0659; G06F 3/067; G06F 3/0683
USPC ....................................................... 711/154
See application file for complete search history.

(56) References Cited

U.S. PATENT DOCUMENTS

| | | | | |
|---|---|---|---|---|
| 2006/0047896 A1* | 3/2006 | Nguyen | ............... | G06F 11/1076 714/6.24 |
| 2009/0077443 A1* | 3/2009 | Nguyen | ............... | G06F 11/1076 714/747 |
| 2010/0138717 A1* | 6/2010 | Wu | .................... | H03M 13/2906 714/752 |
| 2011/0066803 A1* | 3/2011 | Arakawa | ............. | G06F 11/2094 711/E12.019 |
| 2014/0297973 A1 | 10/2014 | Miyamae | | |
| 2015/0154072 A1* | 6/2015 | Diamant | ............. | G06F 11/1092 714/6.24 |
| 2016/0371145 A1* | 12/2016 | Akutsu | ............... | G06F 11/1076 |
| 2018/0011764 A1 | 1/2018 | Akutsu et al. | | |

(Continued)

FOREIGN PATENT DOCUMENTS

JP 2014-191784 A 10/2014
WO 2016/052665 A1 8/2017

*Primary Examiner* — Mohamed M Gebril
(74) *Attorney, Agent, or Firm* — Mattingly & Malur, PC

(57) ABSTRACT

A distributed storage system having a plurality of nodes that include a first node that stores write data in a storage device, and a second node that stores a redundancy code of the write data. The first node is configured to select a second node, among the plurality of nodes, to store the redundancy code after receiving the write data; and send the write data to the selected second node. The second node is configured to receive and hold the write data, determine whether a prescribed starting condition is met asynchronously with reception of the write data, calculate the redundancy code and a plurality of pieces of data and store the redundancy code in the storage device if the prescribed starting condition is met, hold the write data until a prescribed deletion condition is met and delete the write data after the prescribed deletion condition is met.

8 Claims, 19 Drawing Sheets

(56) References Cited

U.S. PATENT DOCUMENTS

2018/0357127 A1 12/2018 Akutsu et al.
2020/0081781 A1 3/2020 Akutsu et al.

* cited by examiner

| /401 | /402 | /403 | /404 | /405 |
|---|---|---|---|---|
| ID | SIZE | DUPLICATION NUM | STORAGEOSLD | L-CHUNK SET |
| 0x12345... | 100 | 3 | 0x5432... | {L1} |
| ... | ... | ... | ... | |

/40  VOLUME MANAGEMENT TABLE

50 LOGICAL CHUNK MANAGEMENT TABLE

| ID 501 | NODEID 502 | PCHUNKSET 503 |
|---|---|---|
| 0x12345678 | 0x49289f3a | {D2} |
| ... | ... | ... |

FIG.5

60 PHYSICAL CHUNK MANAGEMENT TABLE

| ID 401 | DEVICEID 402 | ADDRESS 403 |
|---|---|---|
| 0x33445566 | 0xfffff | aaaa,aaaf |
| ... | ... | ... |

FIG.6

↙80 LOGICAL CHUNK DATA MANAGEMENT TABLE (NODE1)

| 81 | 82 | 83 | 84 |
|---|---|---|---|
| LCHUNK | NODE | DATA TAG | MEC PROCESS |
| $D1_{N1}$ | NODE1 | OWNER | X |
|  | NODE2 | FIRST PARITY | O |
|  | NODE4 | SECOND PARITY | X |
| ... | ... | ... | ... |

FIG.7

↙90 PHYSICAL CHUNK DATA MANAGEMENT TABLE (Node2)

| 91 | 92 | 93 | 94 |
|---|---|---|---|
| PCHUNK | MEC PROCESS | PARITY | PAIR P-CHUNK |
| $D3_{N4}$ | X | - | - |
| $D1_{N1}$ | O | $C1_{N2}, C2_{N2}$ | $D2_{N1}, D2_{N4}, D1_{N3}$ |
| ... | ... | ... | ... |

FIG.8

71 FIRST PARITY DATA UPDATE FREQUENCY TABLE

| DATA OWNER NODE | SECOND PARITY OWNER NODE | DATA | UPDATE COUNT |
|---|---|---|---|
| NODE 1 | NODE 2 | $D1_{N1}$ | 1 |
|  | NODE 2 | $D2_{N1}$ | 5 |
|  | NODE 3 | $D3_{N1}$ | 5 |
|  | NODE 4 | $D4_{N1}$ | 15 |
| NODE 4 | NODE 2 | $D3_{N4}$ | 13 |
|  | NODE 5 | $D4_{N4}$ | 7 |
| ... | ... | ... | ... |

FIG.9

72 SECOND PARITY DATA UPDATE FREQUENCY TABLE

| DATA OWNER NODE | DATA | UPDATE COUNT |
|---|---|---|
| NODE 3 | $D1_{N3}$ | 3 |
|  | $D4_{N3}$ | 10 |
|  | $D5_{N3}$ | 8 |
| NODE 4 | $D2_{N4}$ | 2 |
| NODE 5 | $D1_{N5}$ | 25 |
|  | $D4_{N5}$ | 9 |
| ... | ... | ... |

DISTRIBUTED STORAGE SYSTEM, DATA CONTROL METHOD AND STORAGE MEDIUM

CLAIM OF PRIORITY

The present application claims priority from Japanese patent application JP 2019-231848 filed on Dec. 23, 2019, the content of which is hereby incorporated by reference into this application.

BACKGROUND

The present invention relates to a distributed storage system.

A distributed storage system is a known technology to store a large amount of data. The amount of data handled by the distributed storage system is increasing every year, and it is necessary to ensure redundancy while reducing the data storage cost.

As the technology aiming at ensuring the redundancy and reducing the storage cost, Japanese Patent Application Laid-open Publication No. 2014-191784 and WO2016/052665 are known. Japanese Patent Application Laid-open Publication No. 2014-191784 discloses a technology to duplicate write data between storage nodes, generate a parity asynchronously with the data writing, and release the duplicated data after the parity is generated.

WO2016/052665 discloses a technology applying MEC (multi-stage erasure coding) in which a computer node that has received write data transfers the write data to another computer node, and the destination computer node generates different redundancy codes in two stages (Erasure Coding) based on the data transferred from a plurality of different computer nodes and the write data, and stores the redundancy codes. Also, Japanese Patent Application Laid-open Publication No. 2014-191784 discloses a technology in which a computer node that has received the mirrored data generates the first parity as a redundancy code, and then generates the second parity asynchronously with the data writing.

SUMMARY

In Japanese Patent Application Laid-open Publication No. 2014-191784, the write data is mirrored in a plurality of storage nodes, but the mirrored data is deleted after the parity (redundancy code) is generated, which causes a problem of reduced redundancy.

In WO2016/052665, data is received from a plurality of different computer nodes when the redundancy code is generated after the write data is received, which causes a problem of higher communication load and calculation load.

The present invention was made in view of the problems mentioned above, and is aiming at ensuring redundancy while reducing a calculation load for redundancy codes in a distributed storage system employing erasure coding.

According to one aspect of the present invention, a distributed storage system having a plurality of nodes connected with each other, each of the nodes includes a processor, a memory, a storage device, and a network interface. The nodes include a first node that stores write data in the storage device, and a second node that stores a redundancy code of the write data. The first node is configured to select a second node, among the plurality of nodes, to store the redundancy code after receiving the write data and send the write data to the selected second node. The second node is configured to receive and hold the write data, determine whether a prescribed starting condition is met asynchronously with reception of the write data. The second node calculates the redundancy code based on the write data and a plurality of pieces of data and store the redundancy code in the storage device if the prescribed starting condition is met. The second node holds the write data until a prescribed deletion condition is met and delete the write data after the prescribed deletion condition is met.

Therefore, the present invention can ensure redundancy while reducing a calculation load for redundancy codes in a distributed storage system employing erasure coding.

At least one of the embodiments of the subject matter disclosed in the specification of the present invention will be described in detail in the appended figures and the descriptions below. Other features, embodiments, and effects of the disclosed subject matter will be apparent from the disclosure, drawings, and claims below.

BRIEF DESCRIPTION OF THE DRAWINGS

FIG. 5 is a diagram illustrating an example of the logical chunk management table of the first embodiment of the present invention.

FIG. 6 is a diagram illustrating an example of the physical chunk management table of the first embodiment of the present invention.

FIG. 7 is a diagram illustrating an example of the logical chunk data management table of the first embodiment of the present invention.

FIG. 8 is a diagram illustrating an example of the physical chunk data management table of the first embodiment of the present invention.

FIG. 9 is a diagram illustrating an example of a first parity data update frequency table of the first embodiment of the present invention.

FIG. 10 is a diagram illustrating an example of a second parity data update frequency table of the first embodiment of the present invention.

DETAILED DESCRIPTION OF THE PREFERRED EMBODIMENTS

Below, embodiments of the present invention will be explained with reference to the appended figures.

Embodiment 1

In the descriptions below, various types of information will be explained using several expressions such as "table" "list", or "queue" but the various types of information may be expressed with any other data structures. In order to show that the present invention does not depend on a data structure, "xx table," "xx list," and the like may be referred to as "xx information." The content of each information will be explained using several different terms such as "identification information," "identifier," "name," "ID," and "number," but those terms are interchangeable.

Figure 1:
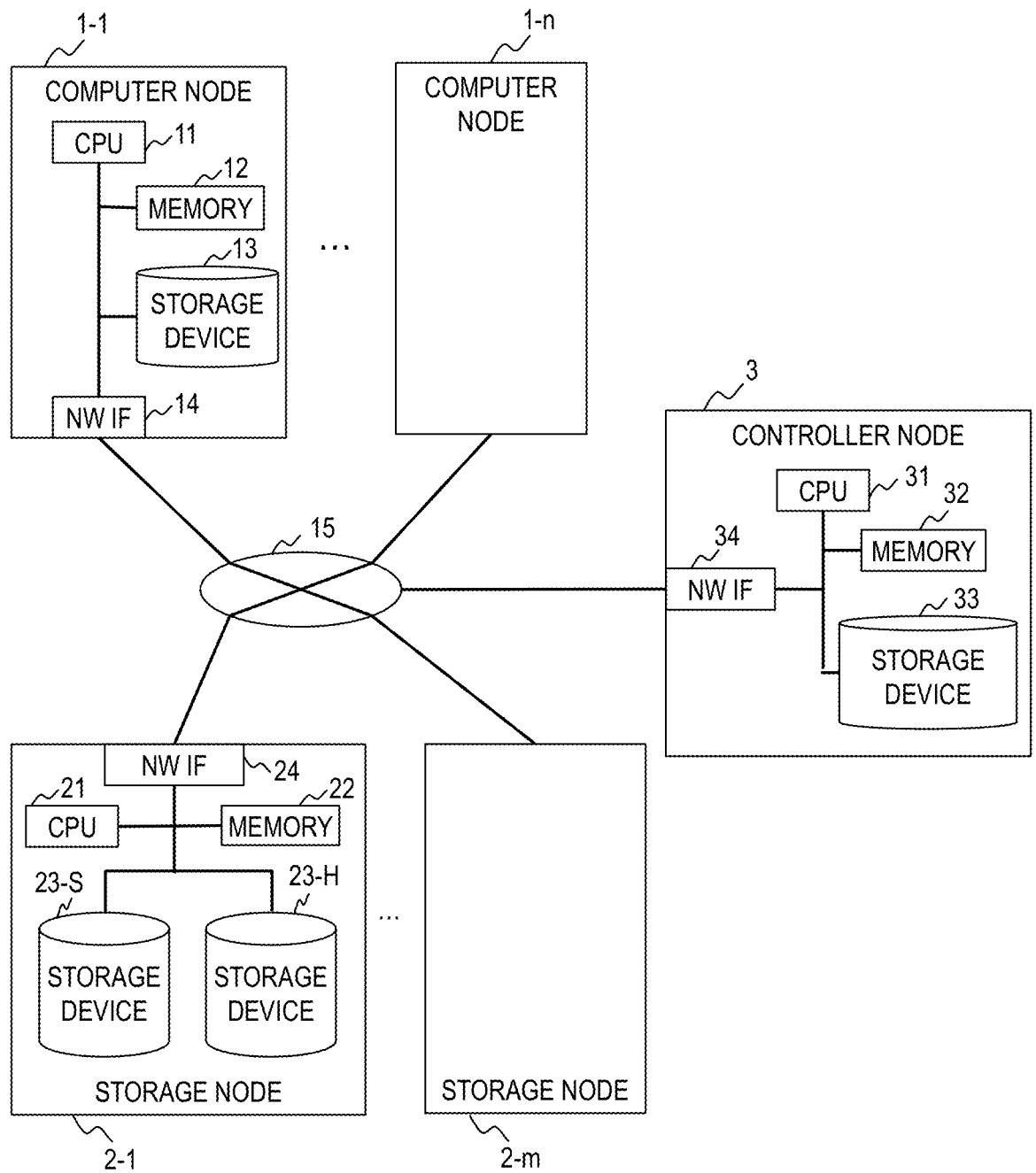
FIG. 1 is a block diagram illustrating an example of a distributed storage system of a first embodiment of the present invention.

FIG. 1 is a block diagram illustrating an example of a distributed storage system of Embodiment 1 of the present invention. In this embodiment, an example of a computer system in which a distributed processing system uses a distributed storage system will be explained.

The computer system includes computer nodes 1-1 to 1-n that constitute a distributed processing system, storage nodes 2-1 to 2-m that constitute a distributed storage system, a controller node 3 that manages the distributed storage system, and a network 15 connecting the respective nodes.

In the descriptions below, the reference character 2 (without a hyphen and a number) will be used for the storage node when it is not necessary to differentiate respective storage nodes from each other. The same applies to the reference characters for other constituting elements.

The distributed processing system is operating in the computer node 1. Because the computer nodes 1-1 to 1-n have the same configuration as each other, only the computer node 1-1 will be explained and the explanation for other nodes will be abridged.

The computer node 1-1 is a computer including a CPU 11, a memory 12, a storage device 13, and a network interface 14. The distributed processing program is loaded into the memory 12 and executed by the CPU 11. The network interface 14 is connected to the network 15 and communicates with other nodes.

The distributed storage system is operating in the storage node 2. Because the storage nodes 2-1 to 2-m have the same configuration as each other, only the storage node 2-1 will be explained and the explanation for other nodes will be abridged.

The storage node 2-1 is a computer including a CPU 21, a memory 22, storage devices 23-S and 23-H, and a network interface 24. Various types of programs functioning as the distributed storage are loaded to the memory 22 and executed by the CPU 21. The network interface 24 is connected to the network 15 and communicates with other nodes.

The storage node 2 applies the Multi-stage Erasing Coding (hereinafter, MEC) that generates different redundant codes (Erasure Coding) in two stages shown in the conventional example above, to reduce the calculation load for the redundant codes (MEC or parity) while ensuring redundancy. In the MEC of this embodiment, the first parity is generated from two pieces of data, the second parity is generated from data including the first parity, and the second parity is stored as MEC. The process of generating the second parity (MEC) is referred to as the MEC process.

The storage device 23-S is constituted of a non-volatile semiconductor memory such as an SSD (Solid State Drive), and the storage device 23-H is constituted of a large capacity non-volatile storage medium such as a hard disk drive. The storage device 23-S has a higher access speed (or read speed) than the storage device 23-H, and the storage device 23-H has a lower capacity unit price than the storage device 23-S.

In the storage node 2 of this embodiment, as will be described later, tiering is performed where data is mainly stored in SSDs, which have a higher access speed, and a parity of data that is updated infrequently is stored in HDDs, which have a lower capacity unit price.

The controller node 3 is a computer including a CPU 31, a memory 32, a storage device 33, and a network interface 34. A control program that controls the distributed storage is loaded to the memory 32 and executed by the CPU 31. The network interface 34 is connected to the network 15 and communicates with the storage node 2.

<Configuration of Storage Node>

Figure 2:
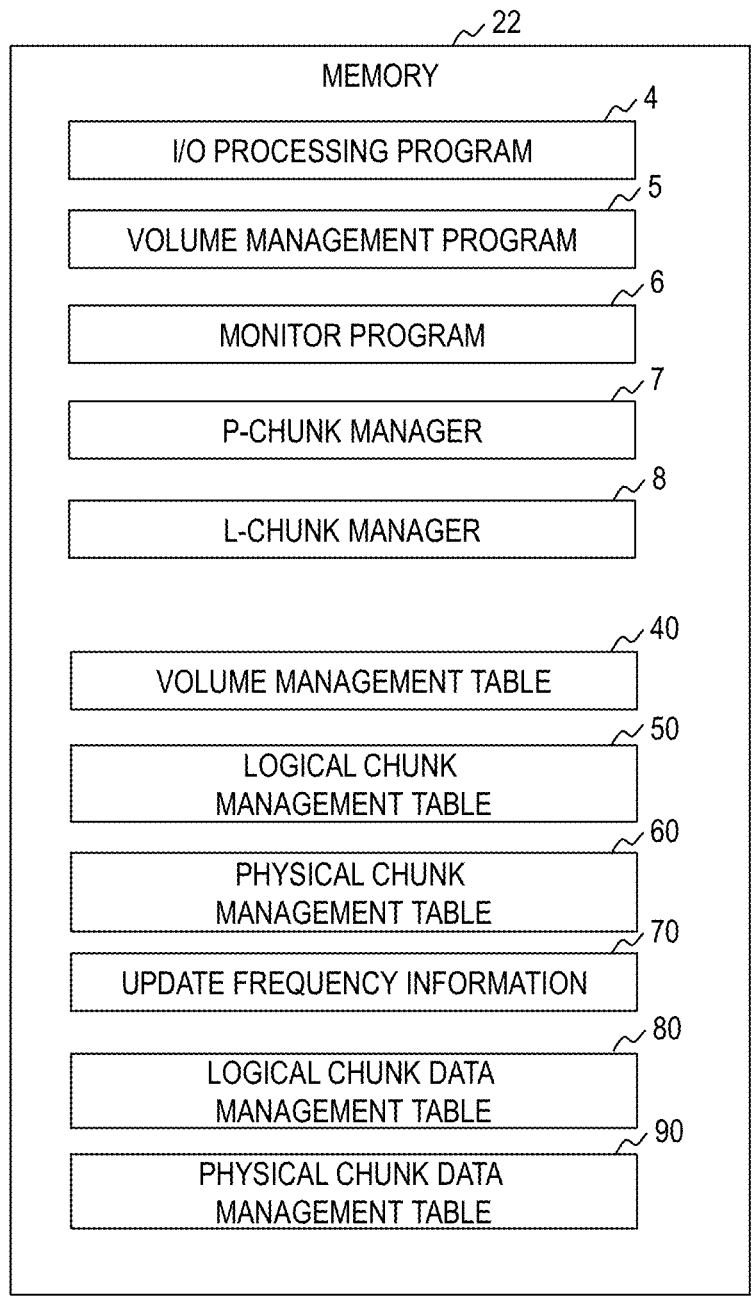
FIG. 2 is a block diagram illustrating an example of the software configuration of the storage node of the first embodiment of the present invention.

FIG. 2 is a block diagram illustrating an example of the software configuration of the storage node 2. In the memory 22 of the storage node 2, programs and tables that constitute the distributed storage system are stored, and cache (not shown) is set.

The distributed storage system programs include an I/O processing program 4, a volume management program 5, a monitor program 6, a physical chunk (P-Chunk in the figure) manager 7 and a logical chunk (L-Chunk in the figure) manager 8.

The tables used by the programs of the distributed storage system include a volume management table 40, a logical chunk management table 50, a physical chunk management table 60, update frequency information 70, a logical chunk data management table 80, and a physical chunk data management 90.

The volume management program 5 performs a process to allocate a storage area (chunk) of the storage device 23 to a volume in response to a request from the computer node 1 or the controller node 3 that uses the distributed storage system. The volume management program 5 also creates, moves, or deletes a volume to be provided to the computer node 1 in response to a request from the controller node 3 or the like.

The I/O processing program 4 controls data reading and writing for the cache and the storage device 23 based on an access request received by the storage node 2. The monitor program 6 monitors the status inside the storage node 2 such as I/O accesses and free space of physical chunks.

The storage node 2 of this embodiment manages a physical storage area (V-1 to V-4 in FIG. 11) of the storage device 23 divided into a prescribed size (capacity) in a physical management unit referred to as a physical chunk (P-Chunk). The storage node 2 of this embodiment manages a logical storage area assigned with at least one physical chunk in a logical management unit referred to as a logical chunk (L-Chunk). A plurality of logical chunks are provided to the computer node 1 as a volume.

In this embodiment, a storage area allocated to a volume is referred to as a chunk, but the present invention is not limited thereto, and a block or the like may be used.

The logical chunk manager 8 manages access to the logical chunk and the configuration of the logical chunks. The physical chunk manager 7 manages access to the physical chunks and the configuration of the physical chunks. The physical chunk manager 7 calculates the parity of physical chunks. The calculation of parity may alternatively be performed by the logical chunk manager 8.

The CPU 21 conducts processes in accordance with the programs of the respective function units, thereby operating as a function unit providing a prescribed function. For example, the CPU 21 functions as the physical chunk manager 7 by executing processes in accordance with the physical chunk management program. The same applies to other programs. Furthermore, the CPU 21 operates as a function unit that provides each of the plurality of functions executed by each program. The computer and the computer system are a device and system including those function units.

<Table>

Figures 3, 4:
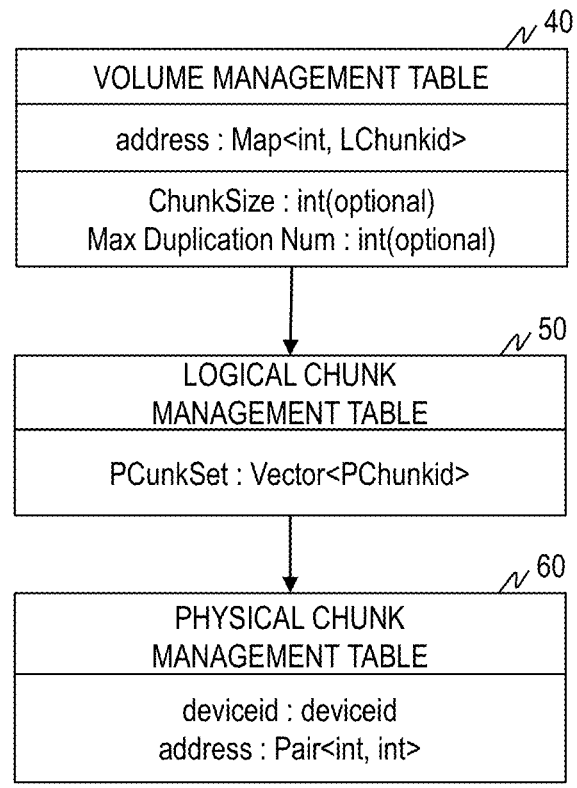
FIG. 3 is a diagram illustrating an example of tables used by the distributed storage system of the first embodiment of the present invention.
FIG. 4 is a diagram illustrating an example of the volume management table of the first embodiment of the present invention.

FIG. 3 is a diagram illustrating an example of tables used by the distributed storage system. The storage node 2 of the distributed storage system manages the data storage position by the volume management table 40, the logical chunk management table 50, and the physical chunk management table 60.

The volume management table 40 manages the relationship between logical chunks and volumes. The logical chunk management table 50 manages a physical chunk allocated to a logical chunk. The physical chunk management table 60 manages a physical storage position by the identifier and address of the storage device 23.

The storage node 2 uses the update frequency information 70, the logical chunk data management table 80, and the physical chunk data management table 90 to determine a chunk to be used for generating a parity, write data to be deleted, and the like. Each table will be explained in detail below.

FIG. 4 is a diagram illustrating an example of the volume management table 40. The volume management table 40 includes, in one record, Id 401 that stores the identifier of a volume, Size 402 that stores the capacity of the volume, Duplication num 403 that stores the number of copies, storageosId 404 that stores the identifier of the OS of the storage node 2, and L chunk set 405 that stores the identifier of a logical chunk assigned to the volume.

The volume management table 40 manages, in L chunk set 405, the relationship of one or more logical chunks assigned to the identifier Id 401 of the volume. Duplication num 403, which is the number of duplicates (the number of mirrored data), may alternatively be set for the entire storage system by adding one to the number of parity drives used for the erasure coding.

FIG. 5 is a diagram illustrating an example of the logical chunk management table 50. The logical chunk management table 50 includes, in one record, Id 501 that stores the identifier of the logical chunk, nodeId 502 that stores the identifier of the storage node 2 that stores the logical chunk, and P chunk set 503 that stores the identifier of the physical chunk that holds the contents of the logical chunk. P chunk set 503 has stored therein an identifier of one or more physical chunks assigned to the corresponding logical chunk.

FIG. 6 is a diagram illustrating an example of the physical chunk management table 60. The physical chunk management table 60 includes, in one record, Id 601 that stores the identifier of the physical chunk, deviceId 602 that stores the identifier of the storage device 23, and address 603 that indicates the position in the storage device 23.

FIG. 7 is a diagram illustrating an example of the logical chunk data management table 80. The logical chunk data management table 80 includes, in one record, L-Chunk 81 that stores the identifier of the logical chunk, Node 82 that stores the identifier of the storage node 2 that stores data or parity of L-Chunk 81, and data tag 83 that indicates a storage state of data, and MEC process 84 that stores information indicating whether the second parity is stored or not.

In this embodiment, the identifier of the logical chunk stored in L-Chunk 81 is "$D1_{N1}$", where "D1" is the identifier of data and "$_{N1}$" is the identifier of the storage node 2.

The "owner" in data tag 83 indicates that the particular data is a data owner node that holds the data received by the storage node 2 (hereinafter referred to as raw data) as is. The "first parity" in data tag 83 indicates that the particular data was used for calculating the first parity. The first parity is a parity generated from a plurality of pieces of raw data.

The "second parity" in data tag 83 indicates that the particular data was used for calculating the second parity. The second parity is a parity generated from data including raw data and the first parity.

MEC process 84 is information indicating whether the particular data is stored as the second parity in the storage node 2 of Node 82 or not, and a circle indicates that the data is stored as the second parity.

In the example illustrated in the figure, the logical chunk data management table 80 is held by the storage node 2-1 (hereinafter, storage node #1), but other storage nodes 2 also have the same logical chunk data management table 80, respectively. The respective storage nodes 2 may have the logical chunk data management table 80 through distributed sharing.

FIG. 8 is a diagram illustrating an example of the physical chunk data management table 90. The physical chunk data management table 90 includes, in one record, P-Chunk 91 that stores the identifier of the physical chunk, MEC process 92 that stores information indicating whether the physical chunk data is stored as the second parity or not, parity 93 that stores the identifier of a parity that restores data, and pair P-Chunk 94 that stores the identifier of the data to be restored.

MEC process 92 is information indicating whether the physical chunk data is stored as the second parity or not, and a circle indicates that the data is stored as the second parity.

Parity 93 has stored therein the identifier of the second parity used for restoring the data of P-Chunk 91. In this embodiment, "2D2P" which means that the data chunk is 2 and the parity chunk is 2, is shown as an example, and parity 93 has two parities stored therein. In the example illustrated in the figure, the parities "$C1_{N2}$" and "$C2_{N2}$" of the storage node 2 (will be referred to as the storage node #2 below) are used for restoring the physical chunk "D1N1."

Pair P-Chunk 94 has stored therein a physical chunk used for restoring the data of P-Chunk 91. In the example illustrated in the figure, the physical chunk "$D2_{N1}$" of Node 1, the physical chunk "$D2_{N4}$" of the storage node 2-4 (will be referred to as the storage node #4), and the physical chunk "$D1_{N3}$" of the storage node 2-3 (will be referred to as the storage node #3) are used for restoring the physical chunk "D1N1."

In the example illustrated in the figure, the physical chunk data management table 90 is held by the storage node #2, but other storage nodes 2 also have the same physical chunk data management table 90, respectively. The respective storage nodes 2 may have the physical chunk data management table 90 through distributed sharing.

The update frequency information 70 is information that manages the update frequency for the physical chunks. The update frequency information 70 of this embodiment is constituted of a first parity data update frequency table 71 of FIG. 9 and a second parity data update frequency table 72 of FIG. 10.

The first parity data update frequency table 71 stores data (physical chunks) that can be used for generating the first parity, and the second parity data update frequency table 72 stores data (physical chunks) that can be used for generating the second parity.

In the storage node 2 of this embodiment, data having a low update frequency is converted to a parity and stored in the storage device 23-H having a lower capacity unit price, and data having a high update frequency is stored in the storage device 23-S constituted of an SSD that has a higher access speed. Thus, the update frequency of each piece of data is calculated and managed, and an example of managing possible data choices for generating the first parity and possible data choices for generating the second parity separately will be described.

The first parity data update frequency table 71 of FIG. 9 includes, in one record, data owner node 711 that stores the identifier of the storage node 2 that holds the raw data, second parity owner node 712 that stores the identifier of the storage node 2 that stores the second parity of the raw data, data 713 that stores the identifier of data (physical chunks) that can be used for the first parity, and update count 714 of the data.

In the example illustrated in the figure, "$D1_{N1}$" to "$D4_{N1}$" are stored in the storage node #1 as data that can be used for generating the first parity. The second parities of "$D1_{N1}$" and "$D2_{N1}$" are stored in the storage node #2, the second parity of "$D3_{N1}$" is stored in the storage node #3, the second parity of "$D4_{N1}$" is stored in the storage node #4, and the respective update counts are stored.

The second parity data update frequency table 72 of FIG. 10 includes, in one record, data owner node 721 that stores the identifier of the storage node 2 that holds the raw data, data 722 that stores the identifier of data (physical chunks) that can be used for generating the second parity, and update count 723 of the data.

In the example illustrated in the figure, the storage node #3 has stored therein "$D1_{N3}$," "$D4_{N3}$," and "$D5_{N3}$" as data that can be used for generating the second parity, and the update count of each data.

<Data to be Used for First Parity and Data to be Used for Second Parity>

Next, an example of a process to determine the data that can be used for the first parity and data that can be used for the second parity will be explained. The data for the first parity and the data for the second parity are determined by the storage node that has received write data.

The storage node 2 that has received the write data stores the data in its own storage device 23, adds meta information of data for the first parity to the data, and transmits the data to the first storage node 2. The storage node 2 also adds meta information of data for the second parity to the same data and transmits the data to the second storage node 2.

Data for the first parity and data for the second parity can be determined by the round-robin method or based on the free space of the physical chunk, or the like.

In the case where data for the first parity and data for the second parity are determined by round-robin, if the number of the data chunk D and the number of the parity chunks P constituting the storage device 23 are aDbP, the storage node 2 makes the decision in the following manner.

For the data that can be used for the first parity, the destination node number increases at an interval of a*(b−1), and for the data that can be used for the second parity, the node number increases every time. For example, in the case of 2D2P, the data reception from the first time to the fourth time will be performed as follows:

1. Data for the first parity is sent to the storage node #2, and data for the second parity is sent to the storage node #3.
2. Data for the first parity is sent to the storage node #2, and data for the second parity is sent to the storage node #4.
3. Data for the first parity is sent to the storage node #3, and data for the second parity is sent to the storage node #5.
4. Data for the first parity is sent to the storage node #3, and data for the second parity is sent to the storage node #6.

In determining data for the first parity and the data for the second parity, the monitor program 6 monitors the free space of the physical chunk of each storage node, and gives priority to the storage node 2 having the physical chunk with a larger free space to send the data for the first parity and the data for the second parity.

With the process described above, the storage node 2 that has received write data adds meta information indicating the first parity or the second parity to a duplicate of the data, and sends the duplicate of the data to another storage node 2.

<Process Overview>

Figure 11:
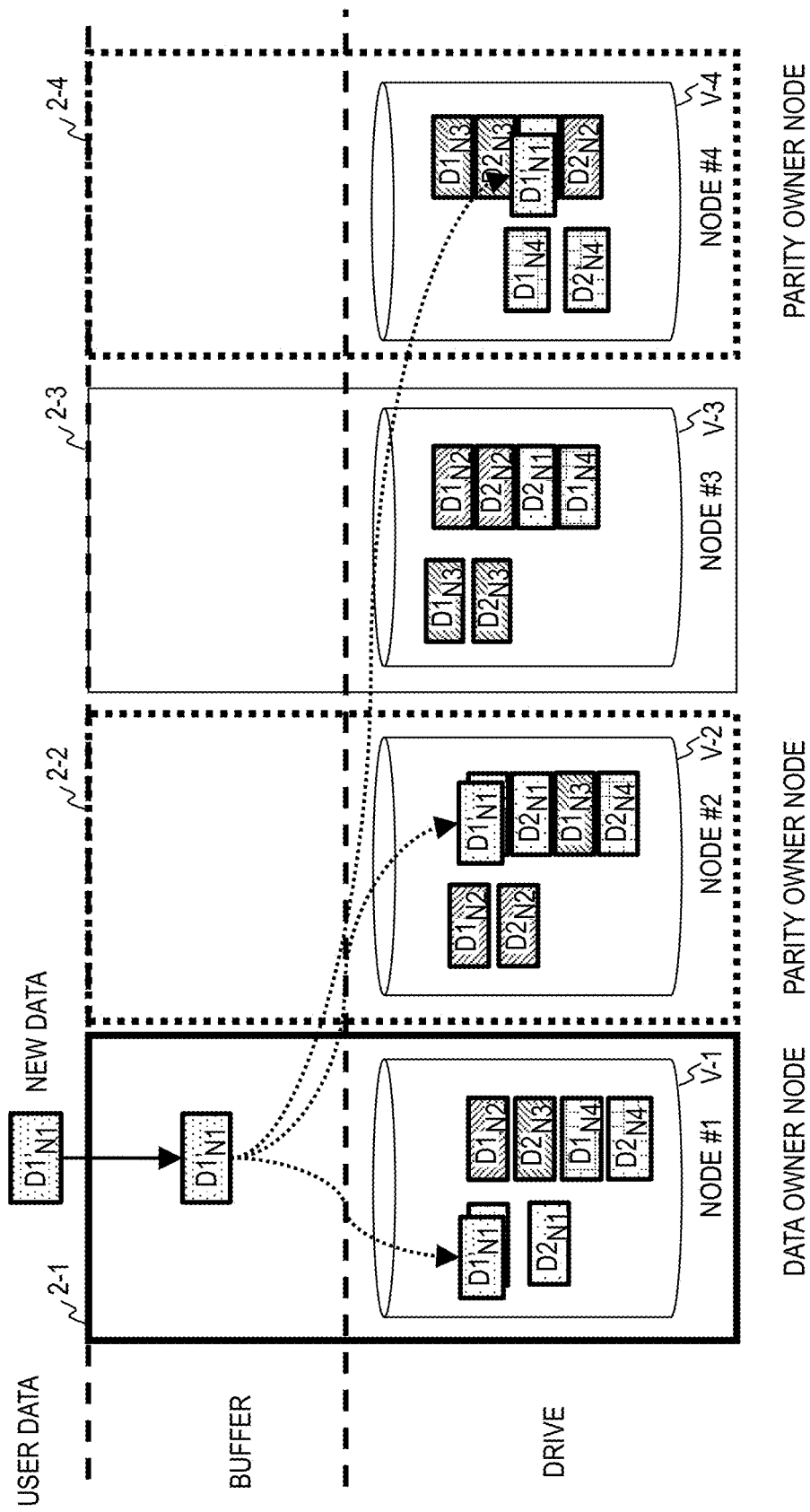
FIG. 11 is a diagram illustrating an example of a data writing process.

FIG. 11 is a diagram illustrating an example of a data writing process. In the example illustrated in the figure, the storage node #1 receives written (update) data "$D1'_{N1}$" and mirrors the data to the storage nodes #2 and #4. In the descriptions below, the write data is equivalent to a physical chunk (or logical chunk), for example.

The storage node 2 refers to the volume management table 40, the logical chunk management table 50, and the physical chunk management table 60 of the destination of the received data to identify the writing position of the storage device 23, and if the data is stored, overwrites the data, and if the data is new, adds a new entry of the data.

When receiving the written (update) data "$D1'_{N1}$," the storage node #1 mirrors the data to another storage node 2 at the same time as writing the data into its own storage device 23.

If the write data is new, the storage node #1 determines a destination storage node 2 by round-robin or the like as described above, and sends the data to the destination after adding meta information for the first parity or the second parity.

On the other hand, if the write data is update data, the storage node #1 refers to the first parity data update frequency table 71 and the second parity data update frequency table 72 to determine the storage node 2 as the mirroring destination, and sends the update data "D1'$_{N1}$" to the storage node 2. The storage node 2 then updates the update count in the first parity data update frequency table 71 or the second parity data update frequency table 72 in which the update data is registered.

In most cases, the storage node 2 that has received the write request is the data owner node, and the storage node 2 as the mirroring destination is the parity owner node. However, if the free space of the storage node 2 is not greater than a prescribed value, the data is stored in another storage node 2.

The storage nodes #2 and #4, which respectively receive the mirrored data, perform different processes depending on the generation state of the second parity of the write data "D1$_{N1}$" in each node. When the second parity of the update target "D1$_{N1}$" has not been generated yet, the storage nodes #2 and #4 overwrite the update data "D1'$_{N1}$." On the other hand, when the second parity of the update target "D1$_{N1}$" has been generated, the second parity of the update data "D1'$_{N1}$" is re-calculated and the second parity is updated. The writing process and the second parity generation (MEC process) will be explained in further detail below.

Figure 12:
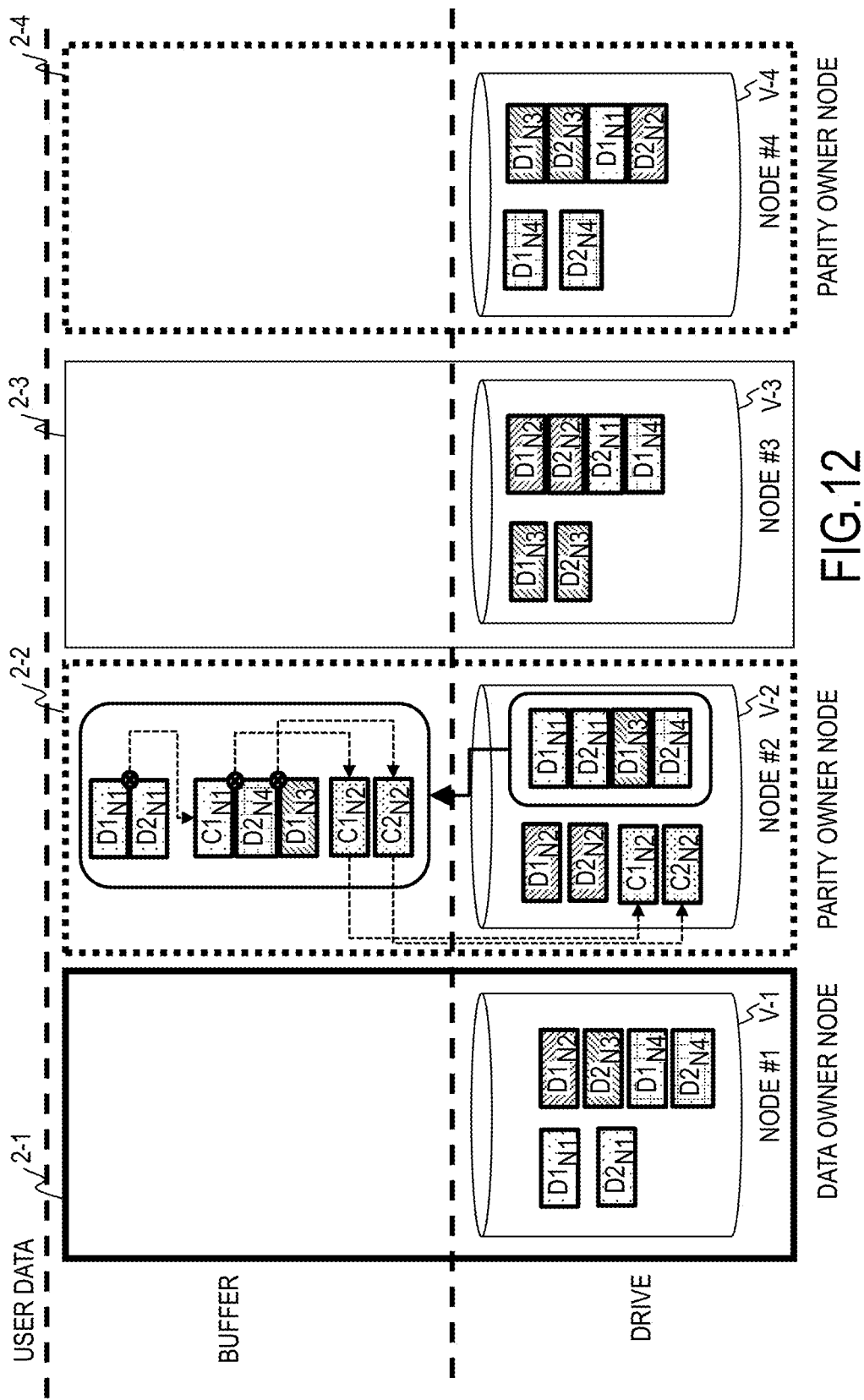
FIG. 12 is a diagram illustrating an example of the parity generation process performed in the mirror destination storage node asynchronously manner with I/O of the first embodiment of the present invention.

FIG. 12 is a diagram illustrating an example of the parity generation process performed in the mirror destination storage node #2 asynchronously manner with I/O. In the example illustrated in the figure, the storage node #2 generates the second parity after receiving new write (update) data "D1$_{N1}$."

The second parity of new data is generated (this is referred to as MEC process) in asynchronously with the data writing (I/O process) when prescribed starting conditions are met in each storage node 2.

The starting conditions for parity generation (MEC process) include the following:

(1) When the free space of a physical chunk is equal to or smaller than X % (prescribed threshold value), (2) When the load of each storage node 2 is equal to or smaller than Y % (prescribed threshold value).

(3) When the number of newly written physical chunks is Z (threshold value) or greater.

Each storage node 2 may restore the data stored as the second parity to the principal data when the free space of the physical chunk exceeds the prescribed threshold of X % to a certain extent.

Below, an example in which the storage node #2 determines the generation timing of the second parity and generates the second parity under the conditions (1) described above will be explained. When the prescribed condition is met, the storage node #2 selects a pair to be used to calculate the first parity from the write data "D1$_{N1}$" for which the second parity is to be generated.

The storage node #2 first refers to the first parity data update frequency table 71, selects "D2$_{N1}$" as the data stored therein and having the smallest update count 714, and calculates "C1$_{N1}$" from XOR of "D1$_{N1}$" and "D2$_{N1}$".

Next, the storage node #2 selects two pieces of data stored therein as a pair to be used to calculate the second parity. The storage node 2 of this embodiment uses two parities (2D2P). The storage node #2 refers to the second parity data update frequency table 72 and selects two pieces of data "D2$_{N4}$" and "D1$_{N3}$" from the ones having the smallest update count 723, and calculates two second parities "C2$_{N1}$" and "C2$_{N2}$" by XOR based on the first parity "C1$_{N1}$."

$$C1_{N1} = C1_{N1} \text{ XOR } D2_{N4}$$

$$C1_{N2} = C1_{N1} \text{ XOR } D1_{N3}$$

The storage node #2 stores the generated second parities "C2$_{N1}$" and "C2$_{N2}$" in the storage device 23. When the physical storage area V-2 of the storage device 23 has a free area equal to or larger than a prescribed value, by holding the raw data "D1$_{N1}$" that was used to generate the second parity, redundancy can be ensured.

When a prescribed deletion condition is met such as the free space in the physical storage area V-2 being less than a prescribed value, the storage node #2 deletes the raw data after the second parity has been generated.

As described above, because the storage nodes 2 obtains data to be used for the parity calculation from its own storage device 23, it is possible to eliminate the need of communicating with other nodes, reduce the processing time, and reduce the network load. Also, because the storage node 2 uses data with a smaller update count for generating a new second parity, the generated second parity is less likely to be recalculated due to the update of data.

Figure 13:
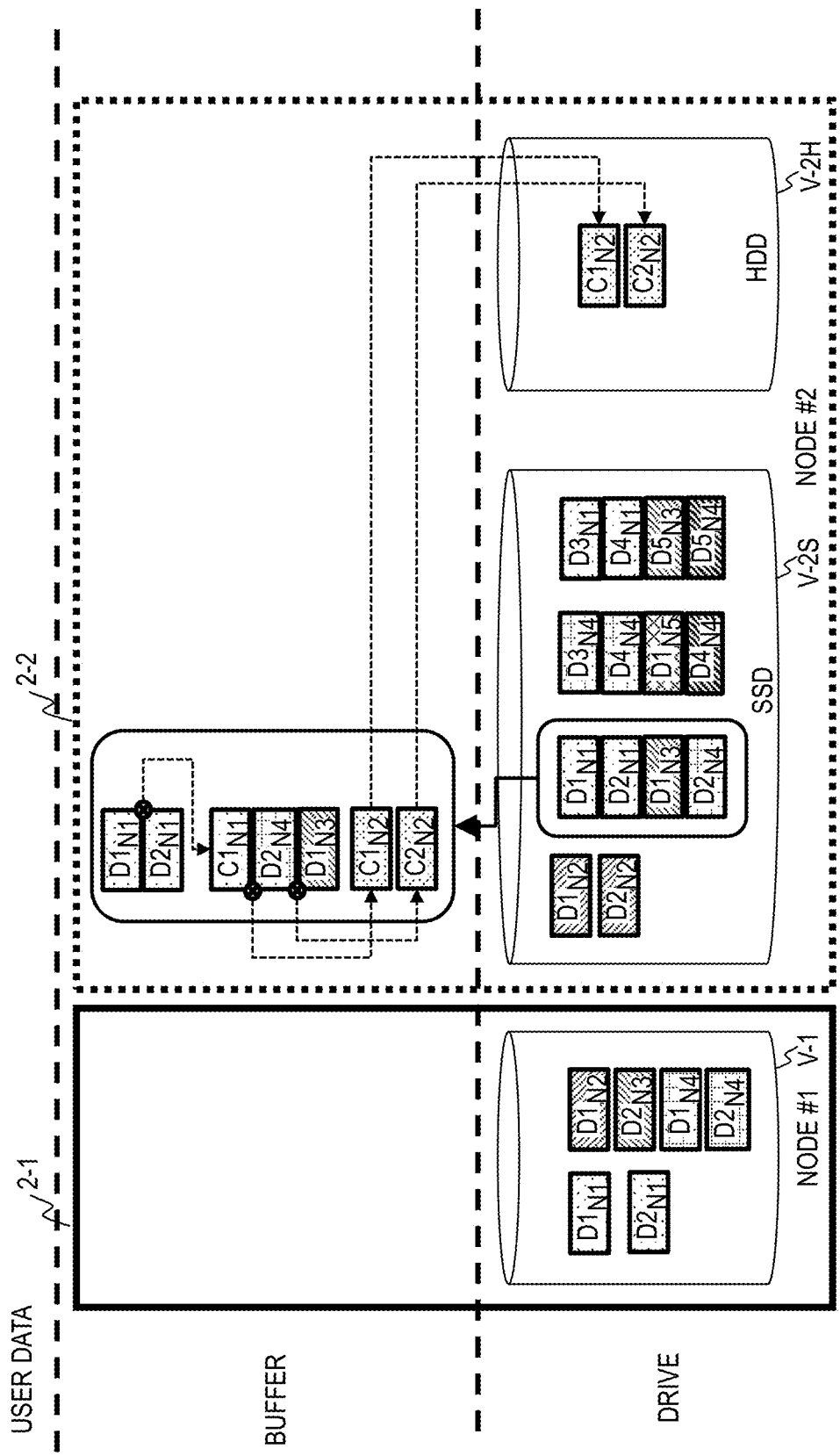
FIG. 13 is a diagram showing an example of a process of tiering the storage positions of the generated second parity and raw data in the mirroring destination storage node of the first embodiment of the present invention.

FIG. 13 is a diagram showing an example of a process of tiering the storage positions of the generated second parity and raw data in the mirroring destination storage node #2. As illustrated in FIG. 1, the storage node 2 includes two types of storage devices: the storage device 23-S constituted of an SSD with higher access speed; and the storage device 23-H with slower access speed than SSD but lower cost per capacity.

The storage node #2 has a physical storage area V-2S on the storage device 23-S and a physical storage area V-2H on the storage device 23-H. The storage node #2 stores the raw data "D1$_{N1}$" and the like in the high-speed physical storage area V-2S and the secondary parity "C1$_{N2}$" and "C2$_{N2}$" in the low-cost physical storage area V-2H.

By storing the raw data in the physical storage area V-2S with higher access speed, it is possible to quickly respond to the read request from the computer node 1. On the other hand, in the process of reading out the second parity, the storage node #2 also needs to read out a pair of data required to restore data, which may cause a need for communications between the storage nodes 2.

Therefore, in the storage node #2, by storing the second parity for performing data restoration in the low-cost physical storage area V-2H, it is possible to effectively use the computer resources of the storage node 2.

Figure 14:
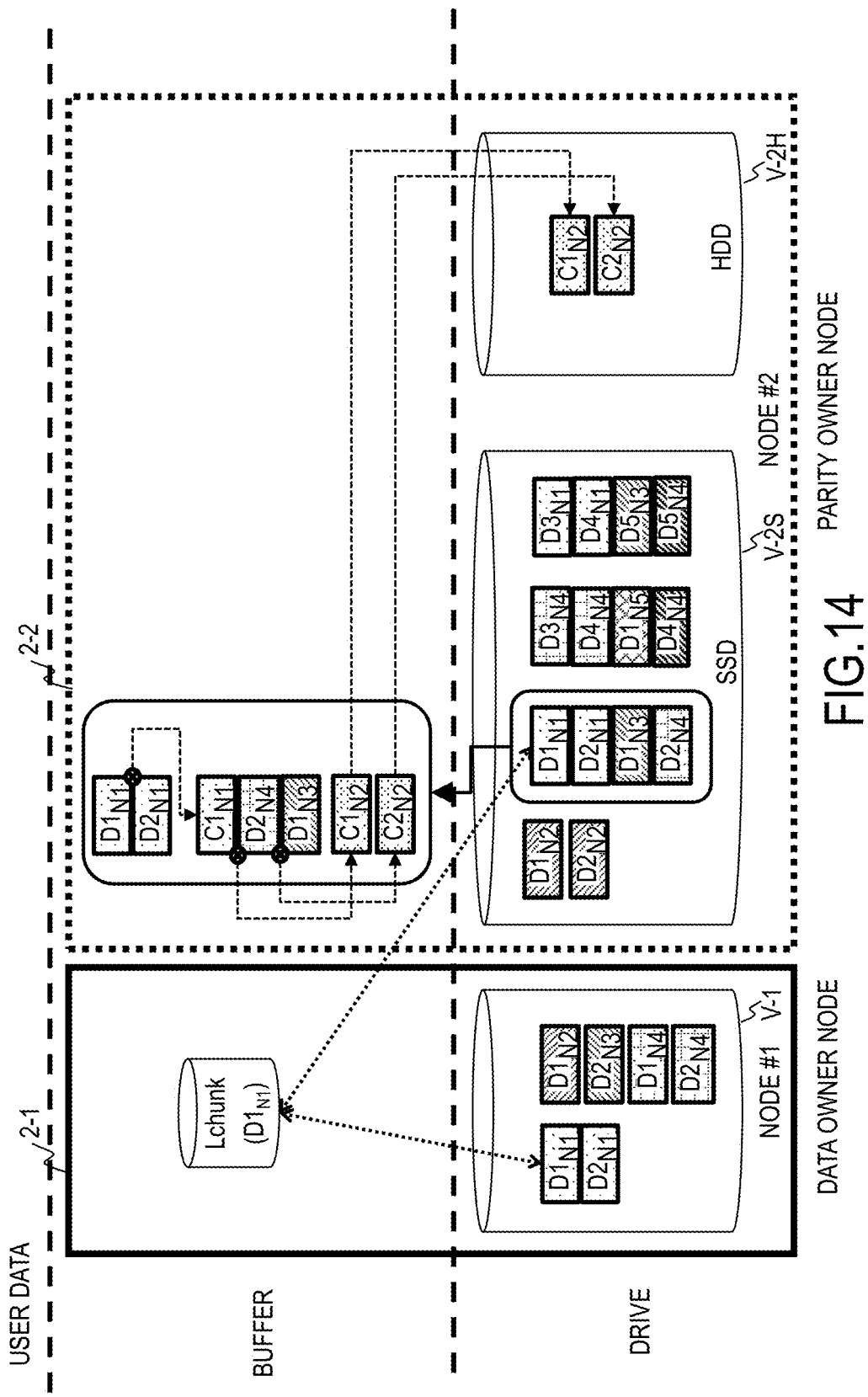
FIG. 14 is a diagram illustrating an example of the data management after the second parity is generated of the first embodiment of the present invention.

FIG. 14 is a diagram illustrating an example of the data management after the second parity is generated. In the illustrated example, the storage node #2 writes the secondary parities "C2$_{N1}$" and "C2$_{N2}$" to the physical storage area V-2H of the storage device 23, and then the storage node #2 outputs a MEC process (second parity generation) completion notification to the storage node #1, which is the data owner node that holds the principal data of the second parity (D1$_{N1}$).

Then, the storage node #2 adds a record of "D1$_{N1}$" to its own physical chunk data management table 90 (FIG. 8), sets a circle in the MEC process 92, sets the second parities "C2$_{N1}$" and "C2$_{N2}$" generated from "D1$_{N1}$" in the parity 93, and sets the data used for the parity calculation in the pair P-Chunk 94.

In the storage node #1 that has received the MEC process completion notification, a circle is set in the MEC process 84 in the record where L-Chunk 81 is "D1$_{N1}$" in the logical chunk data management table 80 to manage the generation of the second parity.

As described above, the parity owner node that has generated the second parity updates the physical chunk data management table 90 and outputs the MEC process completion notification to the data owner node of the raw data. When the condition for parity generation is met, the parity owner node can extract the data necessary for the parity generation process by referring to the MEC process 92. Further, the data owner node can manage the presence or absence of second parity by updating the logical chunk data management table 80.

Figure 15:
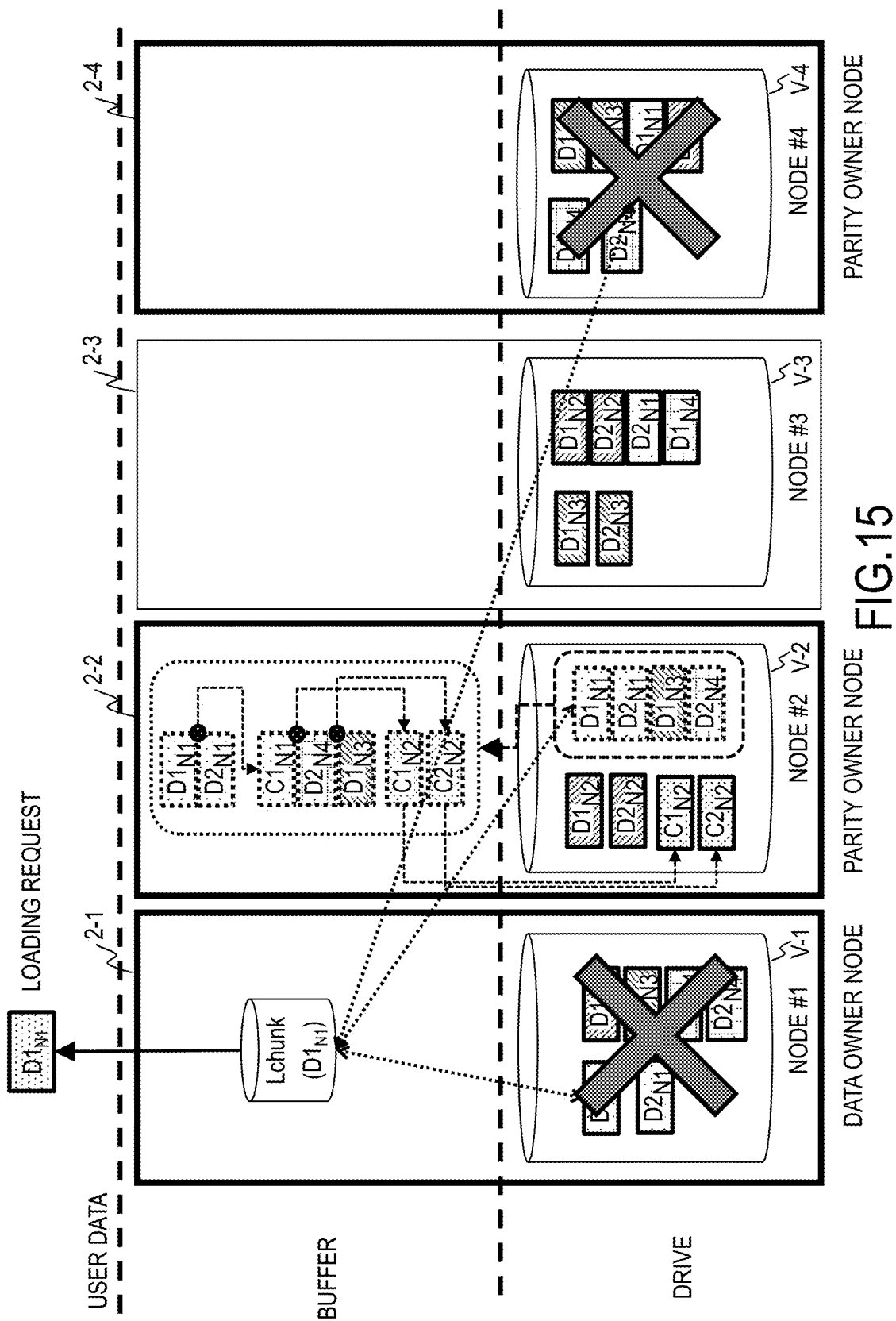
FIG. 15 is a diagram illustrating an example of the reading process in such a case that a failure occurs in the storage node of the first embodiment of the present invention.

FIG. 15 is a diagram illustrating an example of the reading process in such a case that a failure occurs in the storage node 2. In the example illustrated in the figure, a failure has occurred in the storage device 23 (physical storage area) of the storage nodes #1 and #4, and the storage node #1 has received a read request for the data "$D1_{N1}$".

The storage node #1 refers to the logical chunk data management table 80 and identifies the storage node 2 that holds the data "$D1_{N1}$" for which the read request was made. If the data is stored therein, the storage node #1 can read the data out from the storage device 23, but in the example of FIG. 15, the data cannot be read out because the storage device 23 of the storage node #1 has a failure.

The storage node #1 selects the storage node #4 in which the MEC process 84 is not completed from the logical chunk data management table 80, and transmits the read request for "$D1_{N1}$" to the storage node #4. However, because of the failure occurring in the storage device 23 of the storage node #4, the read request is rejected.

The storage node #1 selects the storage node #2 in which the MEC process 84 is completed from the logical chunk data management table 80, and transmits the read request for "$D1_{N1}$" to the storage node #2.

The storage node #2 in which the MEC process is completed determines whether the raw data of "$D1_{N1}$" is present or absent, and if the raw data has not been deleted yet, the storage node #2 can return the data to the storage node #1. On the other hand, if the raw data of "$D1_{N1}$" has been deleted, the storage node #2 restores the data from the second parity.

Figure 16:
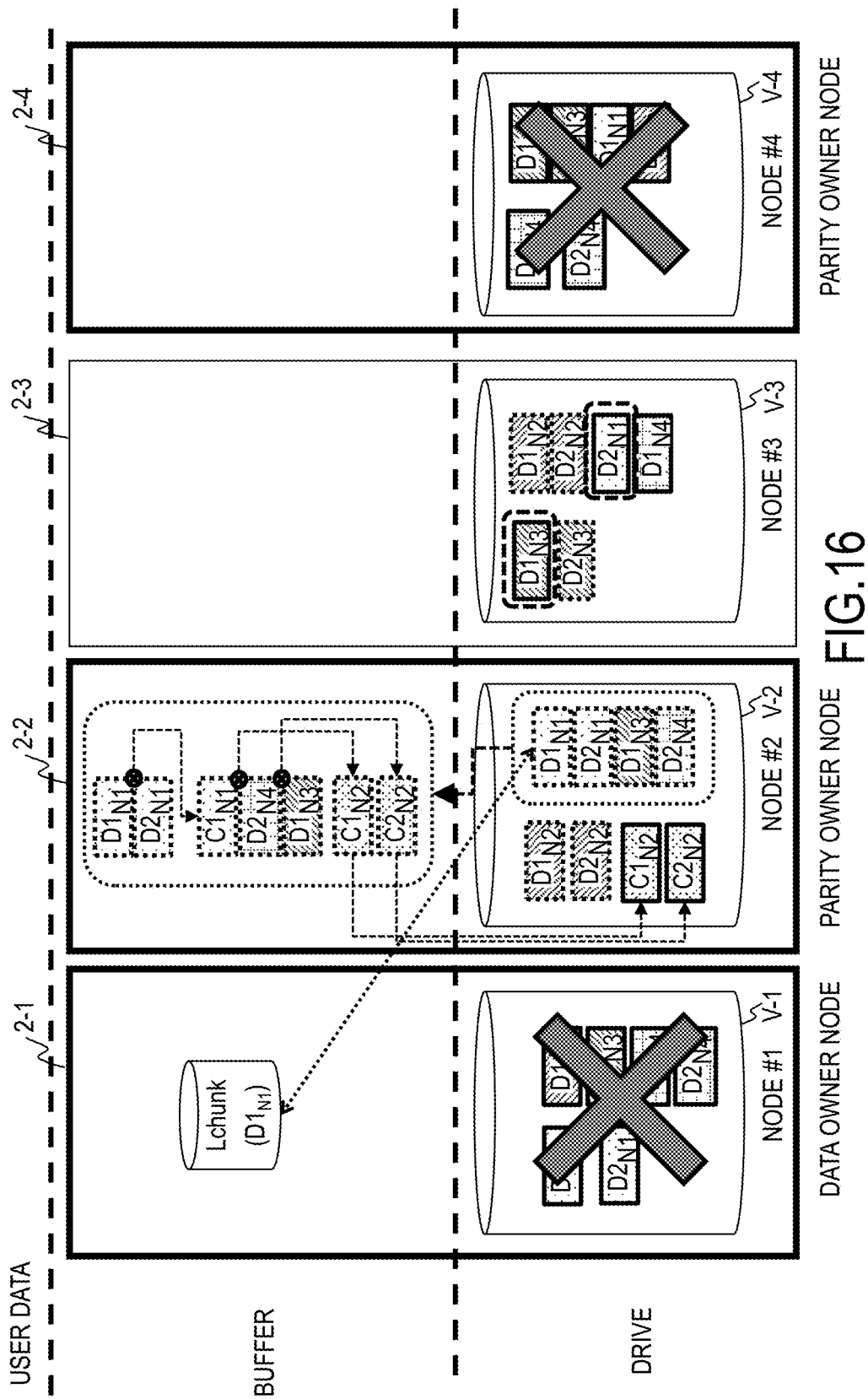
FIG. 16 is a diagram illustrating an example of the restoration process conducted in the storage node of the first embodiment of the present invention.

FIG. 16 is a diagram illustrating an example of the restoration process conducted in the storage node #2. The storage node #2 reads out the second parity from the parity 93 of the data "$D1_{N1}$," and the data needed for restoration from the pair P-chunk 94 in the physical chunk data management table 90.

The storage node #2 obtains "$D2_{N1}$" and "$D1_{N3}$" from the pair P-Chunk 94, refers to the first parity data update frequency table 71 and the second parity data update frequency table 72, and identifies the respective storage nodes holding "$D2_{N1}$" and "$D1_{N3}$".

Because the storage node #3 has the first parity data "$D2_{N1}$" and the second parity data "$D1_{N3}$", the storage node 2 reads out these data from the storage node #3.

The storage node #2 restores the first parity "$C1_{N1}$" from the second parity "$C1_{N2}$" and the data "$D1_{N3}$" and restores the data "$D1_{N1}$" from the data "$D2_{N1}$" and the first parity "$C1_{N1}$," and then transmits the restored data to the storage node #1.

The storage node #1 returns to the computer node 1 the data "$D1_{N1}$" received from the storage node #2.

Figure 17:
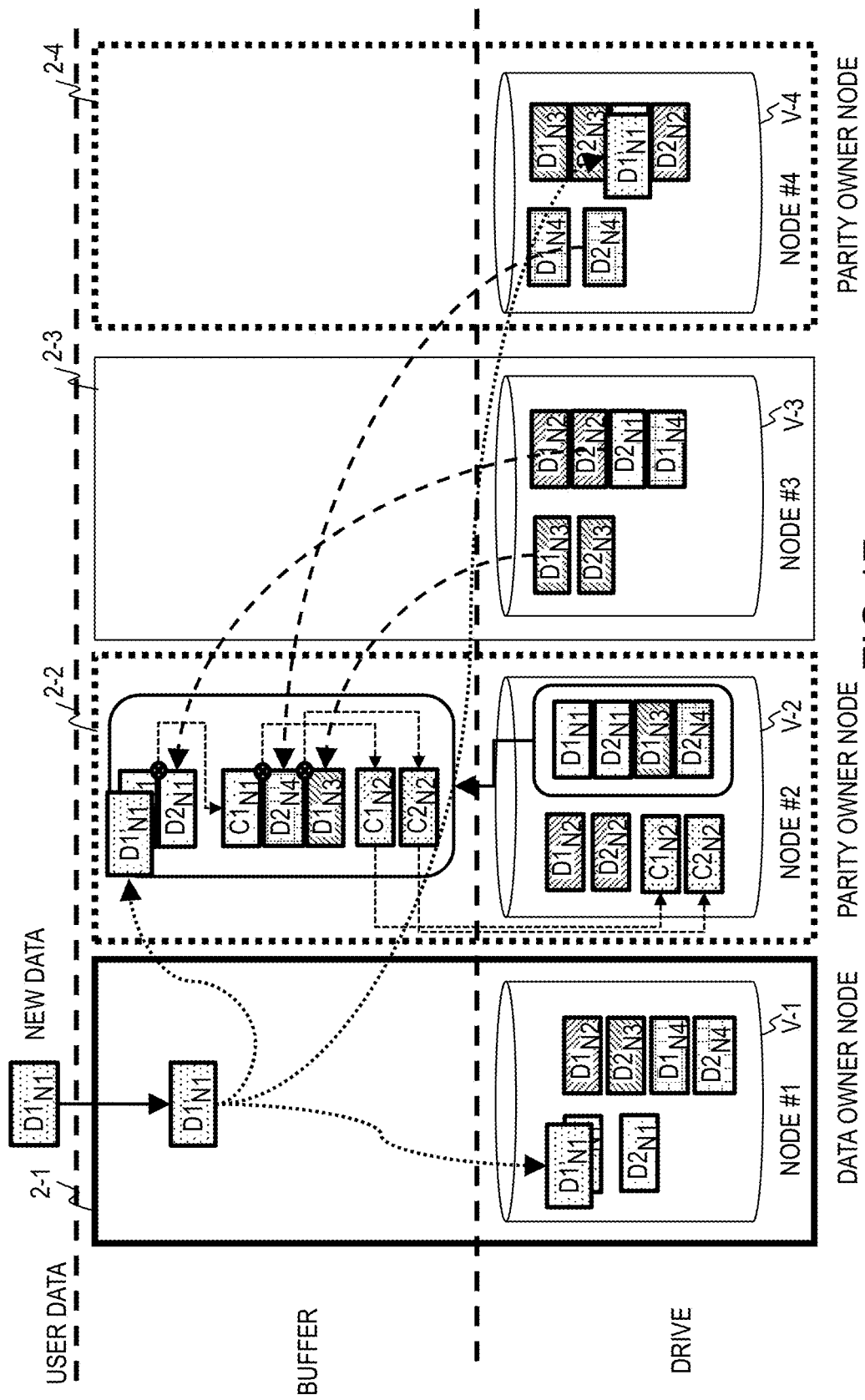
FIG. 17 is a diagram illustrating an example of an update writing process of the first embodiment of the present invention.

FIG. 17 is a diagram illustrating an example of an update writing process. In the example illustrated in the figure, the storage node #1 receives update data "$D1'_{N1}$" and mirrors the data to the storage nodes #2 and #4.

When receiving the update data "$D1'_{N1}$" the storage node #1 overwrites the data in the storage device 23.

At the same time as the data writing, the storage node #1 refers to the first parity data update frequency table 71 and the second parity data update frequency table 72 to determine the storage node 2 as the mirroring destination, and sends the update data "$D1'_{N1}$" to that storage node 2. The storage node #1 then updates the update count in the first parity data update frequency table 71 or the second parity data update frequency table 72 in which the update data is registered.

The mirroring destination storage node #2 performs different processes depending on the generation state of the second parity of the update target data "$D1_{N1}$" in the storage node #2. When the secondary parity of the update target "$D1_{N1}$" has not been generated yet, the storage node #2 overwrites the existing data with the update data "$D1'_{N1}$."

On the other hand, when the second parity of the update target "$D1_{N1}$" has been generated, the storage node #2 re-calculates the second parity of the update data "$D1'_{N1}$" and updates the second parity.

The storage node #2 reads out the data "$D2_{N1}$" "$D2_{N4}$" and "$D1_{N3}$" needed for restoration from the pair P-chunk 94 of the data "$D1_{N1}$" in the physical chunk data management table 90.

The storage node #2 refers to the first parity data update frequency table 71 and the second parity data update frequency table 72 for the data obtained from the pair P-Chunk 94, and identifies the respective storage nodes holding the corresponding data.

Because the storage node #3 has the first parity data "$D2_{N1}$" and the second parity data "$D1_{N3}$", the storage node 2 reads out these data from the storage node #3. Because the storage node #4 has the second parity data "$D2_{N4}$", the storage node 2 reads out this data from the storage node #4.

Then the storage node #2 calculates the first parity "$C1_{N1}$" from XOR of the update data "$D1'_{N1}$" and the data "$D2_{N1}$". Next, the storage node #2 newly calculates the second parity from "$D2_{N4}$" and "$D1_{N3}$" obtained from other storage nodes 2, and the first parity "$C1_{N1}$" in a manner similar to FIG. 12 described above.

The storage node #2 updates the generated second parities "$C2_{N1}$" and "$C2_{N2}$". Through the process described above, the second parity that has undergone the MEC process is updated.

<Detailed Description of Process>

Figure 18:
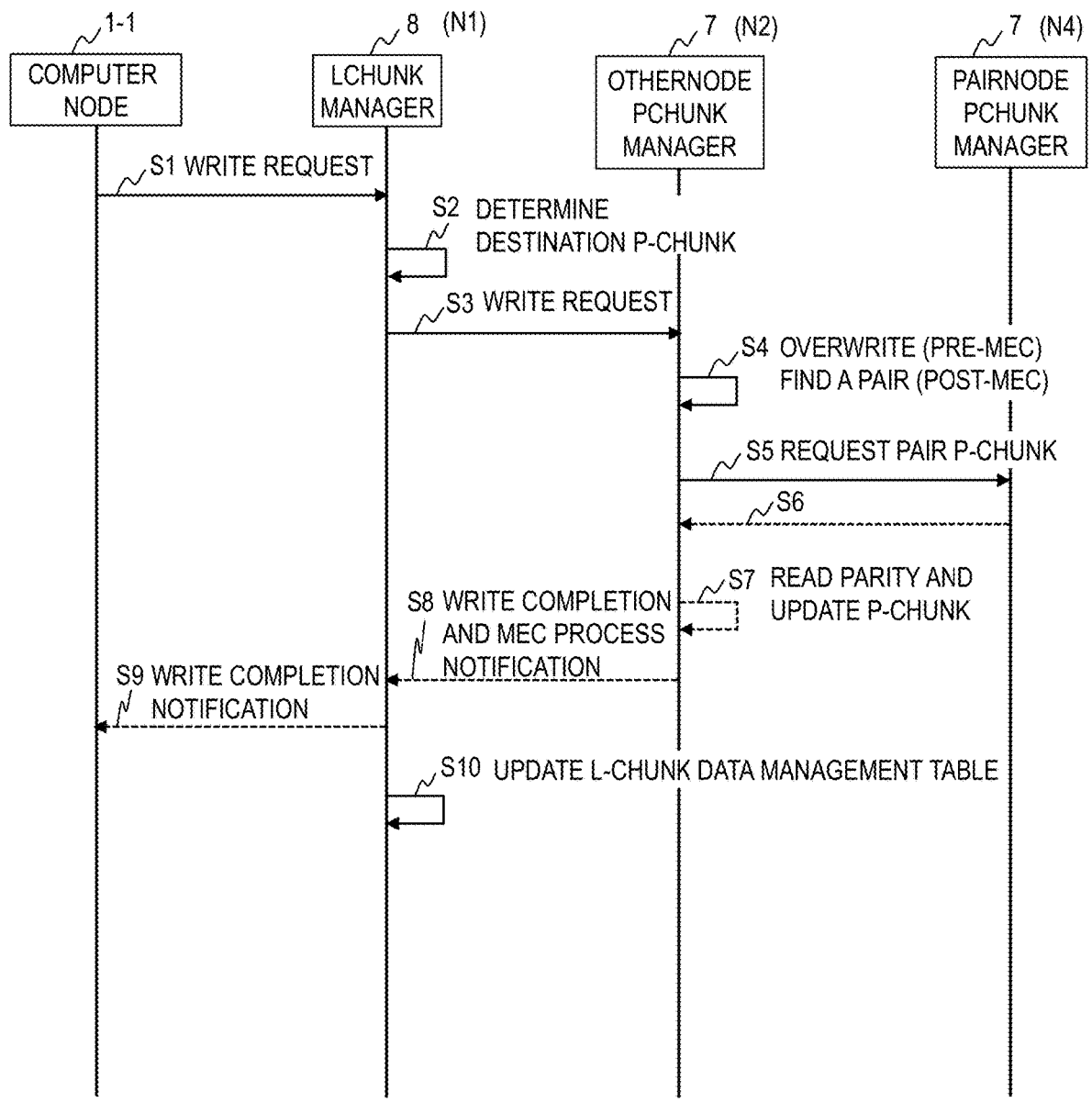
FIG. 18 is a sequence chart illustrating an example of the updating process of the first embodiment of the present invention.

FIG. 18 is a sequence chart illustrating an example of the updating process. This process is performed in FIG. 17 described above.

The computer node 1 sends an update (write) request to the storage node 2 (S1). In the storage node 2 that is the data owner node, the volume management program 5 identifies a logical chunk of the update target, and sends an update request to the logical chunk manager 8.

The logical chunk manager 8 refers to the logical chunk management table 50 to identify the logical chunk in which the data is to be written (S2). The logical chunk manager 8 also refers to the logical chunk data management table 80 to identify the storage node 2 for data mirroring.

The logical chunk manager 8 sends the update data to the storage node 2 identified as the mirroring destination, and overwrites the storage device 23 of the principal storage node 2 with the update data (S3).

In the storage node 2 identified as the mirroring destination, the logical chunk manager 7 refers to the logical chunk data management table 90, and determines whether the update data has undergone the MEC process or not. If the update data has not undergone the MEC process, the logical chunk manager 7 overwrites the existing data with the update data. On the other hand, if the update data has undergone the MEC process, the logical chunk manager 7 reads out a pair of data to be used for calculating the second parity of the update data from the physical chunk management table 90 (S4).

If the data has undergone the MEC process, the physical chunk manager 7 requests another storage node 2 for the data to be paired (S5) and obtains the data (S6). The physical chunk manager 7 calculates and updates the second parity in a manner similar to the update process illustrated in FIG. 17 (S7). Because the MEC process is completed, the physical chunk manager 7 updates the physical chunk data management table 90.

Because the second parity generation is completed, the physical chunk manager 7 notifies the data owner node that the update data has been written and the MEC process has completed (S8). When receiving the notification of the completion of data update and MEC process, the logical chunk manager 8 of the data owner node notifies the computer node 1 that the data writing is completed.

Because the MEC process of the update data is completed in the mirroring destination, the physical chunk manager 8 updates the physical chunk data management table 80.

With the process described above, it is possible to update the raw data in the data owner node and update the second parity that has undergone the MEC process in the parity owner node.

Figure 19:
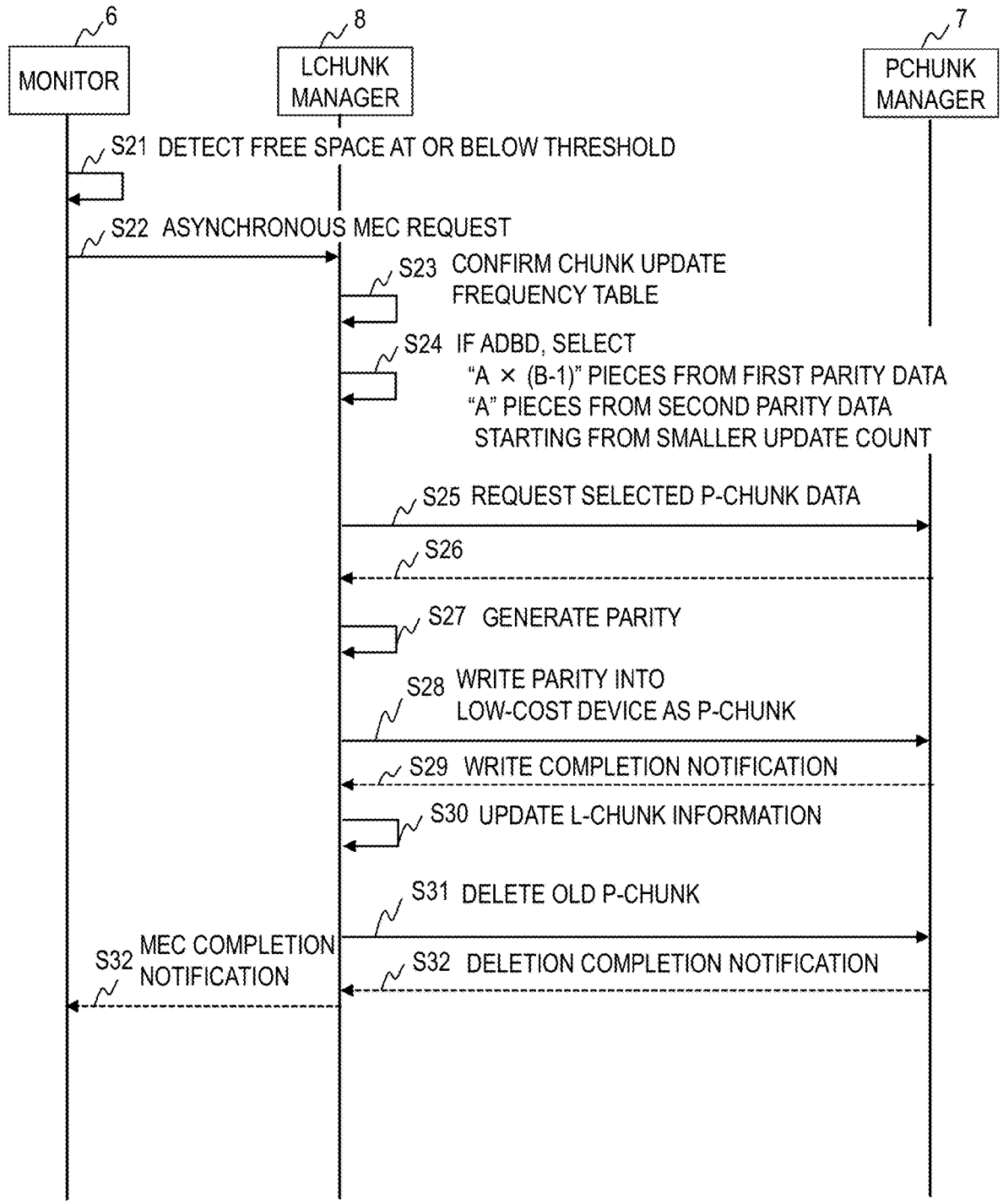
FIG. 19 is a sequence chart illustrating an example of the parity generation process (MEC process) performed in the parity owner node of the first embodiment of the present invention.

FIG. 19 is a sequence chart illustrating an example of the parity generation process (MEC process) performed in the parity owner node. This process is performed when the monitor program 6 of the storage node 2 detects the prescribed starting condition of (1) to (3) described above being met. In the example below, the free space of the physical chunk is used for the prescribed starting condition.

In the parity owner node, the monitor program 6 monitors the free space of the physical storage area V of the storage device 23 and determines whether the free space is equal to or less than a prescribed threshold, which is X % (S21). When the free space is equal to or less than the prescribed threshold X %, the monitor program 6 requests the logical chunk manager 8 to start parity generation (MEC process) asynchronously with I/O access (S22).

The logical chunk manager 8 refers to the first parity data update frequency table 71 and the second parity data update frequency table 72 to extract data that has not undergone the MEC process 84, and select data for the first parity and data for the second parity in ascending order from the ones with the smallest update frequency (S24).

The number of data to be selected is as follows when the number of data chunks D and the number of parity chunks P constituting the storage device 23 are aDbP:

"a"×("b"−1) pieces from the first parity data update frequency table 71; and

"a" pieces from the second parity data update frequency table 72.

Because data that has not undergone the MEC process is also data for the first parity, the logical chunk manager 8 needs to subtract one from "a"×("b"−1) in selecting data from the first parity data update frequency table 71.

The logical chunk manager 8 requests the physical chunk manager 7 for the above-mentioned number of first parity data and the above-mentioned number of secondary parity data (S25). The physical chunk manager 7 obtains the requested data from its own node, and returns the data to the logical chunk manager 8 (S26).

Because the physical chunk manager 7 obtains data to be used for the parity calculation from its own storage device 23, it is possible to eliminate the need of communicating with other nodes, reduce the processing time, and reduce the network load. Also, because the data is stored in the storage device 23-S constituted of an SSD with higher access performance, it is possible to improve the parity process speed.

Next, as described with FIG. 12 above, the logical chunk manager 8 generates the first parity C1 from the XOR of the respective pieces of data for the first parity, and generates a "b"-number of second parities C2 based on XOR of the respective pieces of data for the second parity and the first parity C1 (S27).

Next, the logical chunk manager 8 instructs the physical chunk manager 7 to write the generated second parity C2 to the low-cost storage device 23-H to achieve the tiering of raw data and parity (S28).

When the write completion notification is received from the physical chunk manager 7 (S29), the logical chunk manager 8 updates the logical chunk data management table 80 by writing a circle under the MEC process 84 (S30). The physical chunk manager 7 also updates the physical chunk data management table 90 for the data that has undergone the MEC process.

Next, the logical chunk manager 8 sends a command to the physical chunk manager 7 to delete the physical chunk (old P-Chunk in the figure) that has undergone the MEC process (S31). When receiving the deletion completion notification from the physical chunk manager 7 (S32), the logical chunk manager 8 sends the MEC process completion notification to the monitor program 6 and ends the process. If the physical chunk has a free space, the physical chunk that has undergone the MEC process may be deleted after a prescribed deletion condition is met.

As described above, according to this embodiment, the storage node 2 generates the second parity after a prescribed starting condition is met, in an asynchronous manner with I/O, which makes it possible to reduce a load in calculating the first parity and the second parity. Also, by holding the received write data until a prescribed deletion condition is met, the storage node 2 can ensure the redundancy of the same level as mirroring.

Because the storage nodes 2 obtains data to be used for the parity calculation from its own storage device 23, it is possible to eliminate the need of communicating with other nodes, reduce the processing time, and reduce the network load. Furthermore, because the storage node 2 stores its own data in the storage device 23-S constituted of an SSD with higher access performance, it is possible to improve the parity process speed and reading speed.

Furthermore, the storage node 2 selects the data having a lower update frequency first as data to be used for the parity calculation, and stores the resultant second parity in the storage device 23-H constituted of an HDD having a lower capacity unit price. This way, tiering can be automatically conducted, and the computer resources of the storage node 2 can be efficiently used.

Embodiment 2

Figure 20:
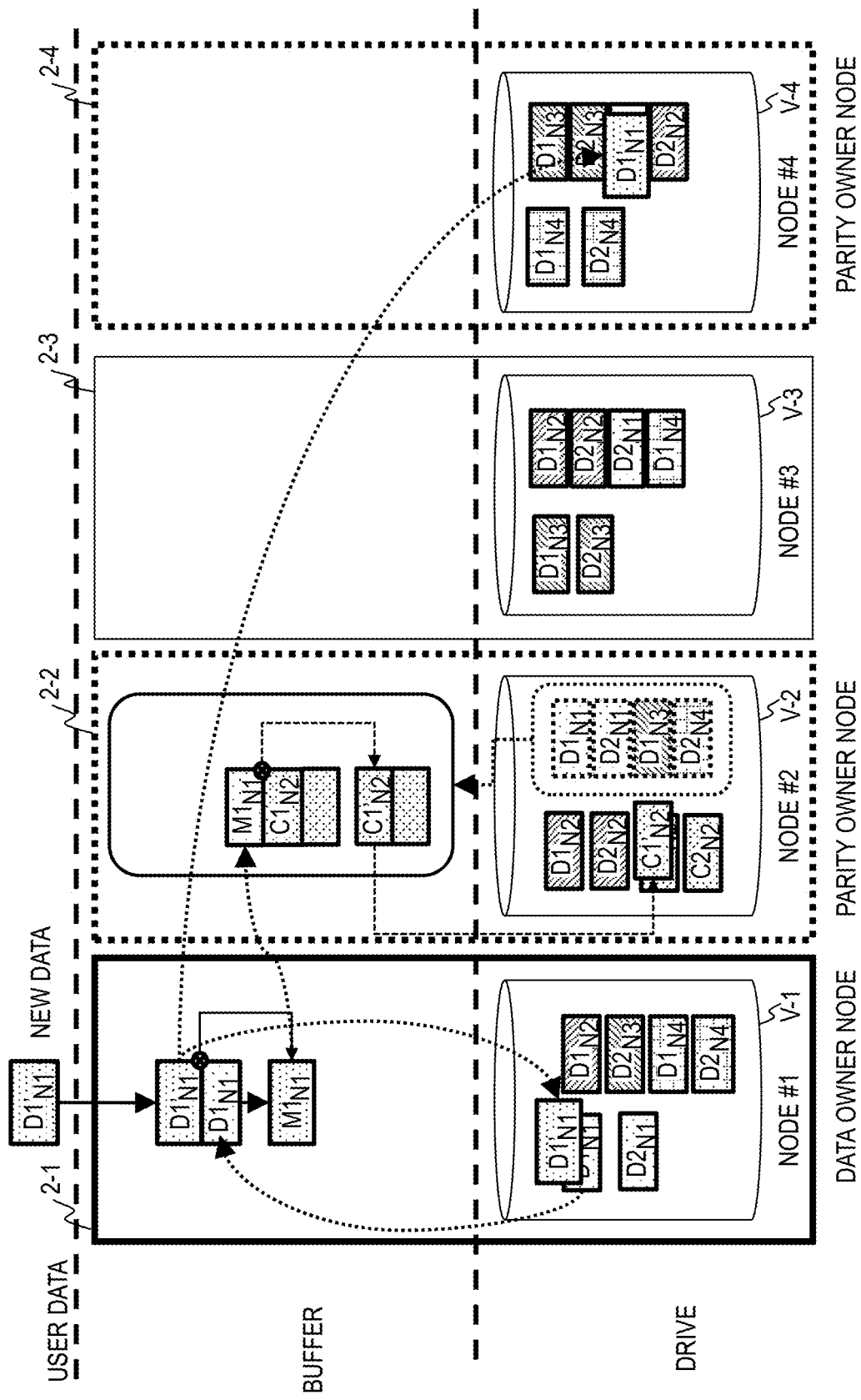
FIG. 20 is a diagram illustrating an example of the update writing process after the parity process (MEC process) of a second embodiment of the present invention.
Figure 21:
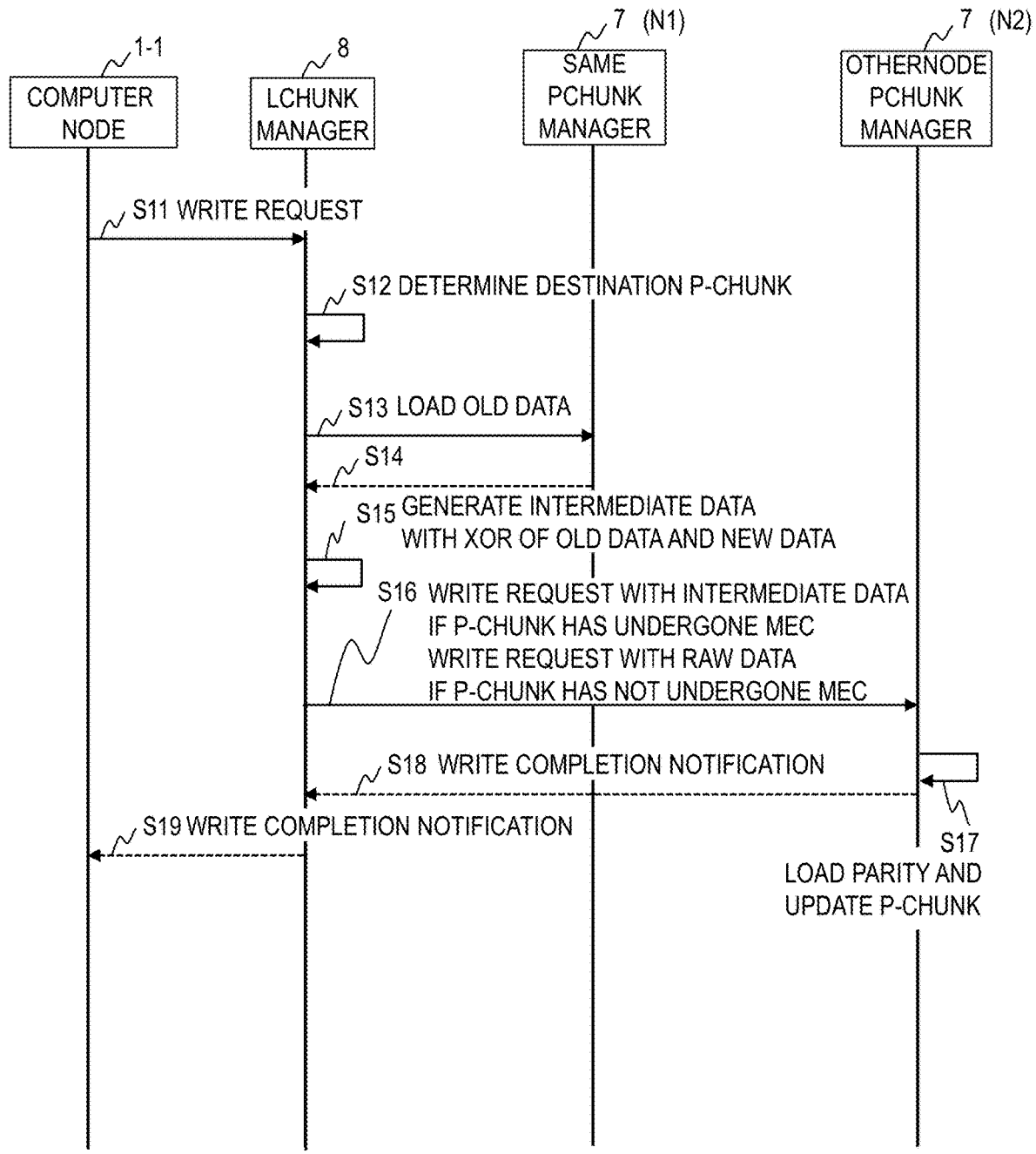
FIG. 21 is a sequence chart illustrating an example of the update writing process after the parity process (MEC process) of the second embodiment of the present invention.

FIGS. 20 and 21 illustrate Embodiment 2. In Embodiment 1 described above, in writing the update data, the data owner node sends the update data to the parity owner node as is. This embodiment differs from Embodiment 1 in that, if the update data has undergone the MEC process in the parity owner node, the data owner node generates intermediate data and sends the intermediate data to the parity owner node. Other configurations are the same as those of Embodiment 1 described above.

FIG. 20 is a diagram illustrating an example of the update writing process after the parity process (MEC process). FIG. 21 is a sequence chart illustrating an example of the update writing process after the parity process (MEC process).

The storage node #1 of the data owner node receives the update data "$D1'_{N1}$" from the computer node 1 (S11).

The logical chunk manager 8 of the storage node #1 identifies the update target data "$D1_{N1}$" to which the update data "$D1'_{N1}$" (new data) is written (S12), and then reads the update target data "$D1_{N1}$" (old data) (S13, S14). The physical chunk manager 7 overwrites the update target data "$D1_{N1}$" with the update data "$D1'_{N1}$".

The logical chunk manager 8 generates intermediate data "$M1_{N1}$" from XOR of the update target data "$D1_{N1}$" and the update data "$D1'_{N1}$" (S15). Next, the logical chunk manager 8 refers to the logical chunk data management table 80 to determine whether or not the update target data "$D1_{N1}$" of other nodes has undergone the MEC process, and sends the update data "$D1'_{N1}$" to the nodes that have not undergone the MEC process (S16). The logical chunk manager 8 sends the intermediate data "$M1_{N1}$" to the storage node #2 in which the update target data "$D1_{N1}$" has undergone the MEC process.

In the storage node 2 that is the parity owner node that has undergone the MEC process and that has received the intermediate data "$M1_{N1}$," the physical chunk manager 7 calculates the second parity for update "$C1'N_2$" from XOR of the intermediate data "$M1_{N1}$" and the existing second parity "$C1_{N2}$," and updates the physical chunk (S17). Also, a second parity for update "$C2'_{N2}$" is calculated from XOR of the existing second parity "$C2_{N2}$" and the intermediate data "$M1_{N1}$" and the physical chunk is updated.

The storage node #2 sends a notification indicating that the second parity update is completed to the storage node #1 (S18), and the storage node #1 sends an update completion notification to the computer node 1 and ends the process.

Through the process described above, the data owner node sends the intermediate data "$M1_{N1}$" to the parity owner node that has already gone through the MEC process when the update data is written. The parity owner node only needs to calculate the second parity for update "$C1'_{N2}$" based on the intermediate data "$M1_{N1}$" and the existing second parity "$C1_{N2}$", which makes it possible to eliminate the need of re-calculating the parity, and speed up the process.

Embodiment 3

Figure 22:
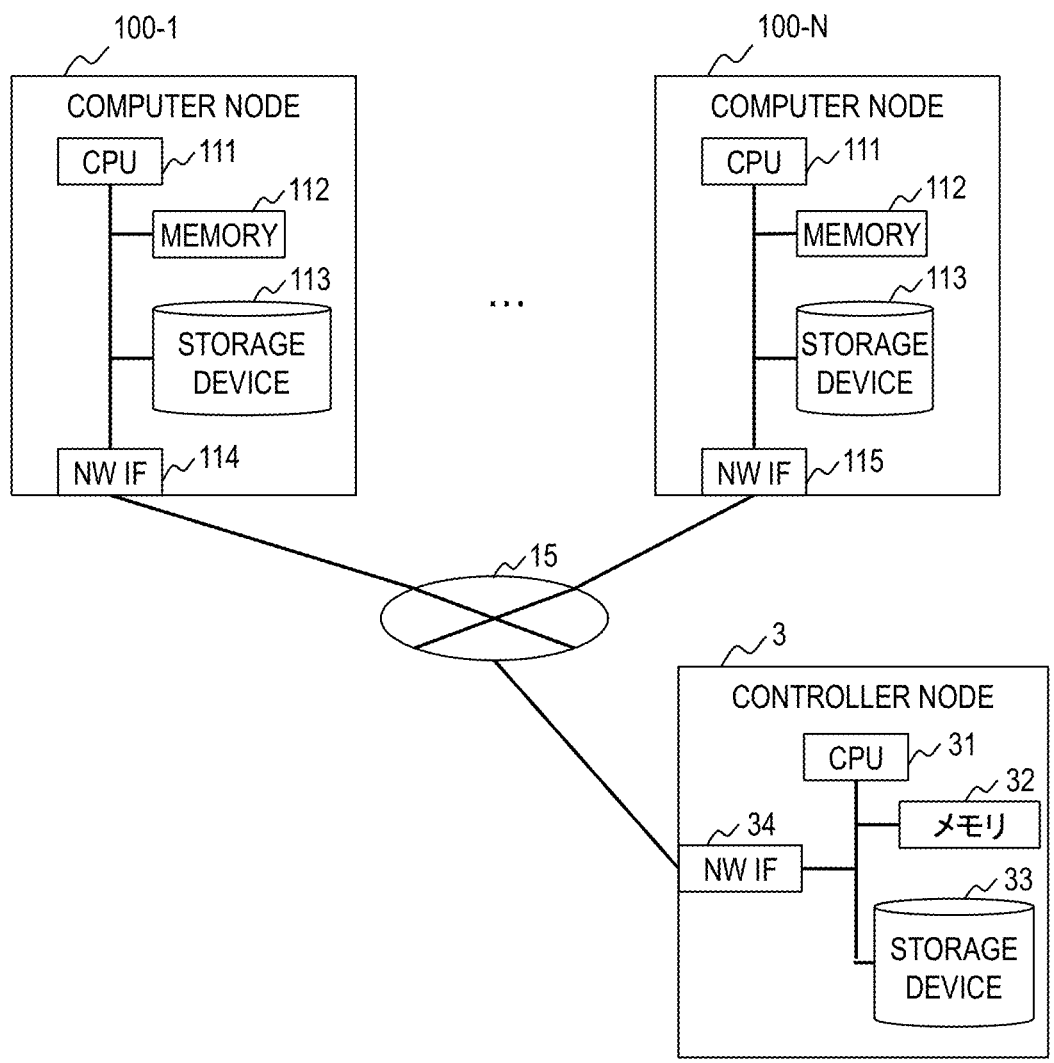
FIG. 22 is a block diagram illustrating an example of the computer system of a third first embodiment of the present invention.
Figure 23:
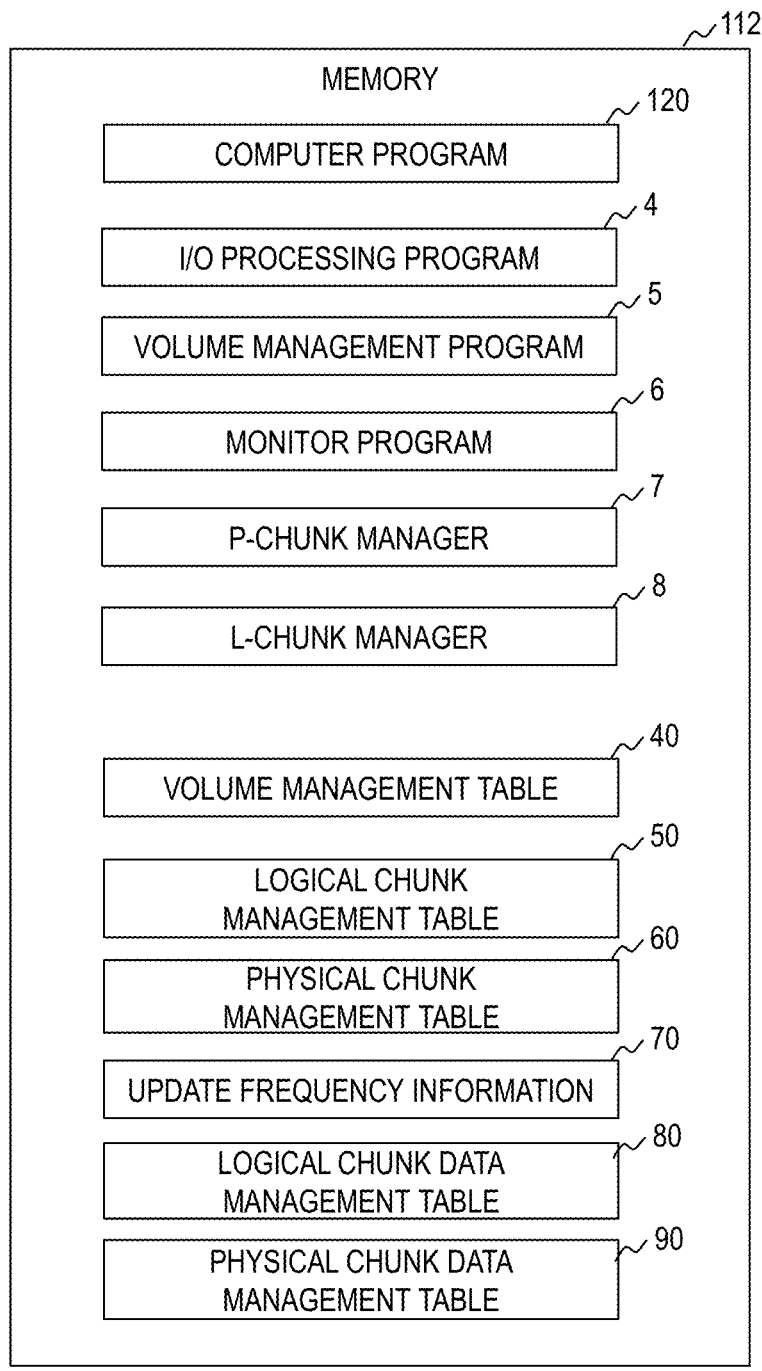
FIG. 23 is a block diagram illustrating an example of the software configuration of the computer node of the third first embodiment of the present invention.

FIGS. 22 and 23 illustrate Embodiment 3 of the present invention. Embodiment 3 shows an example in which the distributed storage system is constituted of computer nodes 100-1 to 100-N that each double as a computer node and a storage node.

FIG. 22 is a block diagram illustrating an example of the computer system. The computer node 100 of Embodiment 3 includes a CPU 111, a memory 112, a storage device 113, and a network interface 114.

FIG. 23 is a block diagram illustrating an example of the software configuration of the computer node 1. A computer program realizing services provided by the computer node 1 is loaded to the memory 112, and executed by the CPU 111. Other programs and data are the same as those of Embodiment 1.

Effects similar to those of Embodiments 1 and 2 can be achieved in a computer node 100 in which a computer node doubles as a storage node.

CONCLUSION

As described above, the distributed storage system of embodiments above has the following configuration.

(1) A distributed storage system having a plurality of nodes (storage nodes 2) connected with each other, each of the nodes comprising a processor (CPU21), a memory (22), a storage device (23), and a network interface (15), wherein the nodes (2) include a first node (data owner node Node 1) that stores write data ($D1'_{N1}$) in the storage device (23), and a second node (parity owner node Node 2) that stores a redundancy code ($C1_{N2}$) of the write data ($D1'_{N1}$), wherein the first node (Node 1) is configured to: select a second node (Node 2), among the plurality of nodes (2), to store the redundancy code ($C1_{N2}$) after receiving the write data ($D1'_{N1}$); and send the write data ($D1'_{N1}$) to the selected second node (Node 2), and wherein the second node (Node 2) is configured to: receive and hold the write data ($D1'_{N1}$); determine whether a prescribed starting condition is met asynchronously with reception of the write data ($D1'_{N1}$); calculate the redundancy code ($C1_{N2}$) based on the write data ($D1'_{N1}$) and a plurality of pieces of data and store the redundancy code ($C1_{N2}$) in the storage device (23) if the prescribed starting condition is met; hold the write data ($D1'_{N1}$) until a prescribed deletion condition is met; and delete the write data ($D1'_{N1}$) after the prescribed deletion condition is met.

This configuration allows the storage node 2 to generate the second parity after a prescribed starting condition is met, in an asynchronous manner with I/O, which makes it possible to reduce a load in calculating the first parity and the second parity. Also, by holding the received write data until a prescribed deletion condition is met, the storage node 2 can ensure the redundancy of the same level as mirroring.

(2) The distributed storage system according to (1), wherein the second node (Node 2) is configured to: select first data ($D1_{N2}$) and second data ($D2_{N4}$) from data stored in the second node as a plurality of data to be used for calculating the redundancy code; calculate a first redundancy code ($C1_{N2}$) based on the write data ($D1'_{N1}$) and the first data ($D1_{N2}$); and calculate the redundancy code ($C1_{N2}$) based on the first redundancy code ($C1_{N2}$) and the second data ($D2_{N4}$).

This configuration allows the storage nodes 2 to obtain data to be used for the parity calculation from its own storage device 23, which eliminates the need for communication with other nodes and reduces the processing time and the network load.

(3) The distributed storage system according to (2), wherein the storage device (23) includes a first storage device (23-S) and a second storage device (23-H), the first storage device (23-S) having a higher reading speed than the second storage device (23-H), and wherein the second node (Node 2) is configured to store the write data ($D1'_{N1}$) in the first storage device (23-S), and store the redundancy code ($C1_{N2}$) in the second storage device (23-H).

This configuration allows the storage node 2 to store data in the storage device 23-S constituted of an SSD with higher access performance, which makes it possible to improve the parity process speed and reading speed.

(4) The distributed storage system according to (1), wherein the second node (Node 2) sends to the first node (Node 1) a redundancy process complete notification indicating that the redundancy code has been calculated and stored in the storage device (23), and wherein the first node (Node 1) holds management information (MEC process 84 in the logical chunk data management table 80) for managing whether a redundancy code ($C1_{N2}$) for the write data ($D1'_{N1}$) has been generated in the second node (Node 2) or not, and updates the management information (80) corresponding to the write data ($D1'_{N1}$) after receiving the redundancy process completion notification.

This configuration allows the data owner node (Node 1) to determine whether the MEC process has been completed or not in the parity owner node (Node 2) in the process of writing the update data.

(5) The distributed storage system according to (2), wherein, when the write data is update data ($D1'_{N1}$), the first node (Node 1) overwrites update target data ($D1_{N1}$) stored in the first node with the update data, and sends the update data ($D1'_{N1}$) to the second node (Node 2), and wherein the second node (Node 2) is configured to: read the first data ($D2_{N1}$) and the second data ($D2_{N4}$) when receiving the update data ($D1'_{N1}$); calculate a new first redundancy code ($C1'_{N1}$) based on the update data ($D1'_{N1}$) and the first data ($D2_{N1}$); calculate a redundancy code for update ($C1'_{N1}$) based on the new first redundancy code ($C1'_{N1}$) and the second data ($D2_{N4}$); and update the redundancy code ($C1_{N1}$) stored in the storage device (23) with the redundancy code for update ($C1'_{N1}$).

With this configuration, after receiving the update data ($D1'_{N1}$), the parity owner node (Node 2) reads the first data ($D2_{N1}$) and the second data ($D2_{N4}$) from another node if the update target data ($D1_{N1}$) has already been through the MEC process, generates a new redundancy code for update ($C1'_{N1}$), and updates the existing redundancy code ($C1_{N1}$).

(6) The distributed storage system according to (2), wherein, when the write data is update data ($D1'_{N1}$), the first node (Node 1) reads update target data ($D1_{N1}$) that is stored in the first node, calculates intermediate data ($M1_{N1}$) based on the update data ($D1'_{N1}$) and the update target data ($D1_{N1}$), overwrites the update target data ($D1_{N1}$) stored in the first node with the update data ($D1'_{N1}$), and sends the intermediate data ($M1_{N1}$) to the second node (Node 2), and wherein the second node (Node 2) is configured to calculate a redundancy code for update ($C1'_{N2}$) based on the intermediate data ($M1_{N1}$) and the redundancy code ($C1_{N2}$) after receiving the intermediate data ($M1_{N1}$), and update the redundancy code ($C1_{N2}$) stored in the storage device (23) with the redundancy code for update ($C1'_{N2}$).

With this configuration, the data owner node (Node 1) sends the intermediate data "$M1_{N1}$" to the parity owner node (Node 2) that has already gone through the MEC process in the process of writing the update data ($D1'_{N1}$). The parity owner node (Node 2) only needs to calculate the second parity for update "$C1'_{N2}$" based on the intermediate data "$M1_{N1}$" and the existing second parity "$C1_{N2}$", which makes it possible to eliminate the need for re-calculation of the parity, and speed up the process.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A distributed storage system, comprising:
a plurality of nodes connected with each other, each of the nodes comprising a processor, a memory, a storage device, and a network interface,
wherein the nodes include a first node that stores write data in the storage device, and a second node that stores a redundancy code of the write data,
wherein the first node is configured to: select the second node, among the plurality of nodes, to store the redundancy code after receiving the write data; and send the write data to the selected second node, and
wherein the second node is configured to:
receive and hold the write data;
determine whether a prescribed starting condition is met asynchronously with respect to receiving the write data;
calculate the redundancy code based on the write data and a plurality of pieces of data and store the redundancy code in the storage device if the prescribed starting condition is met;
hold the write data until a prescribed deletion condition is met; and
delete the write data after the prescribed deletion condition is met,
wherein the second node is configured to:
select first data and second data from data stored among the nodes as a plurality of data to be used for calculating the redundancy code, the first data and the second data are stored in different nodes and are parities;
calculate a first redundancy code based on the write data and the first data; and
calculate the redundancy code based on the first redundancy code and the second data.

2. The distributed storage system according to claim 1, wherein the storage device includes a first storage device and a second storage device, the first storage device having a higher reading speed than the second storage device, and
wherein the second node is configured to store the write data in the first storage device, and store the redundancy code in the second storage device.

3. The distributed storage system according to claim 1, wherein the second node sends to the first node a redundancy process complete notification indicating that the redundancy code has been calculated and stored in the storage device, and wherein the first node holds management information for managing whether a redundancy code for the write data has been generated in the second node or not, and updates the management information corresponding to the write data after receiving the redundancy process completion notification.

4. A data control method of a distributed storage system having a plurality of nodes connected with each other, each of the nodes comprising a processor, a memory, a storage device, and a network interface, wherein the nodes include a first node that stores write data in the storage device, and a second node that stores a redundancy code of the write data, wherein the data control method comprises:

a mirroring step in which the first node selects the second node, among the plurality of nodes, to store the redundancy code after receiving the write data, and sends the write data to the selected second node, and a redundancy code generation step in which the second node receives and holds the write data, determines whether a prescribed starting condition is met asynchronously with respect to receiving the write data, calculates the redundancy code based on the write data and a plurality of pieces of data and stores the redundancy code in the storage device if the prescribed starting condition is met, and a deletion step in which the second node holds the write data until a prescribed deletion condition is met, and deletes the write data after the prescribed deletion condition is met, wherein the second node is configured to:

select first data and second data from data stored among the nodes as a plurality of data to be used for calculating the redundancy code, the first data and the second data are stored in different nodes and are parities;

calculate a first redundancy code based on the write data and the first data; and calculate the redundancy code based on the first redundancy code and the second data.

5. The data control method according to claim 4, wherein the storage device includes a first storage device and a second storage device, the first storage device having a higher reading speed than the second storage device, wherein the redundancy code generation step includes storing the write data in the first storage device, and storing the redundancy code in the second storage device.

6. The data control method according to claim 4, further comprising a management step in which the first node manages, using management information, whether a redundancy code for the write data has been generated in the second node or not, wherein the redundancy code generation step includes sending to the first node a redundancy process complete notification indicating that the redundancy code has been calculated and stored in the storage device, and wherein the management step includes updating the management information corresponding to the write data when receiving the redundancy process completion notification.

7. A non-transitory computer-readable storage medium having stored therein programs for controlling a computer including a processor, a memory, a storage device, and a network interface, wherein the programs cause the computer to perform steps comprising:

a redundancy code generation step of receiving and holding write data, determining whether a prescribed starting condition is met asynchronously with reception of the write data, calculating the redundancy code based on the write data and a plurality of pieces of data and stores the redundancy code in the storage device if the prescribed starting condition is met, and a deletion step of holding the write data until a prescribed deletion condition is met, and deleting the write data after the prescribed deletion condition is met, wherein the second node is configured to:

select first data and second data from data stored among the nodes as a plurality of data to be used for calculating the redundancy code, the first data and the second data are stored in different nodes and are parities;

calculate a first redundancy code based on the write data and the first data; and calculate the redundancy code based on the first redundancy code and the second data.

8. The storage medium according to claim 7, wherein the redundancy code generation step includes storing the write data in a first storage device and storing the redundancy code in a second storage device, the first storage device and the second storage device constituting the storage device, and wherein the first storage device has a faster reading speed than the second storage device.

* * * * *